(12) United States Patent
Yoshinaga et al.

(10) Patent No.: US 8,717,682 B2
(45) Date of Patent: May 6, 2014

(54) SINGLE FOCAL LENGTH LENS SYSTEM, INTERCHANGEABLE LENS APPARATUS AND CAMERA SYSTEM

(71) Applicant: Panasonic Corporation, Osaka (JP)

(72) Inventors: Shunichiro Yoshinaga, Osaka (JP); Kyoichi Miyazaki, Osaka (JP); Takao Yamanaka, Osaka (JP); Keiichi Zaitsu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/757,339

(22) Filed: Feb. 1, 2013

(65) Prior Publication Data
US 2013/0148006 A1 Jun. 13, 2013

Related U.S. Application Data

(63) Continuation of application No. PCT/JP2011/004403, filed on Aug. 3, 2011.

(30) Foreign Application Priority Data

Aug. 25, 2010 (JP) ................................ 2010-187820

(51) Int. Cl.
*G02B 9/12* (2006.01)
*G02B 15/22* (2006.01)
*G02B 15/177* (2006.01)
(52) U.S. Cl.
CPC *G02B 15/22* (2013.01); *G02B 9/12* (2013.01); *G02B 15/177* (2013.01)
USPC ............................. 359/684; 359/784; 359/791
(58) Field of Classification Search
CPC ............. G02B 13/0035; G02B 13/006; G02B 15/173; G02B 15/177; G02B 15/22; G02B 9/12; G03B 13/18

USPC ......... 359/676, 689, 716, 745, 748, 749, 784, 359/791
See application file for complete search history.

(56) References Cited

U.S. PATENT DOCUMENTS

| 5,066,113 A | | 11/1991 | Nakajima et al. | |
|---|---|---|---|---|
| 5,530,593 A | * | 6/1996 | Shibayama et al. | .......... 359/689 |

(Continued)

FOREIGN PATENT DOCUMENTS

| JP | 03-103807 A | 4/1991 |
|---|---|---|
| JP | 06-130291 A | 5/1994 |

(Continued)

OTHER PUBLICATIONS

International Search Report issued in International Patent Application No. PCT/JP2011/004403 mailed Sep. 6, 2011.

*Primary Examiner* — Thong Nguyen
(74) *Attorney, Agent, or Firm* — McDermott Will & Emery LLP

(57) ABSTRACT

A single focal length lens system comprising: at least a front lens unit having positive or negative power, and being fixed in focusing; a focusing lens unit having positive power, and moving along an optical axis in focusing; and a rear lens unit having negative power, and being fixed in focusing, wherein the focusing lens unit includes: a cemented lens of a negative lens and a positive lens; and a positive single lens located on the image side relative to the cemented lens and having an aspheric surface, the rear lens unit is composed of one single lens, and the condition: $-0.5 < f_W/f_{GR} < -0.1$ ($f_W$, $f_{GR}$: focal lengths of the entire single focal length lens system, the rear lens unit) is satisfied.

10 Claims, 21 Drawing Sheets

(56) References Cited

U.S. PATENT DOCUMENTS

| | | | |
|---|---|---|---|
| 5,592,334 A * | 1/1997 | Oshikiri et al. | 359/689 |
| 5,805,359 A | 9/1998 | Yamanashi | |
| 7,593,163 B2 * | 9/2009 | Yamada et al. | 359/675 |
| 2004/0190158 A1 | 9/2004 | Sato | |
| 2006/0056831 A1 * | 3/2006 | Horio et al. | 396/55 |
| 2008/0074760 A1 | 3/2008 | Sato | |
| 2009/0201592 A1 | 8/2009 | Yamada | |
| 2011/0304929 A1 * | 12/2011 | Tsutsumi | 359/784 |

FOREIGN PATENT DOCUMENTS

| | | |
|---|---|---|
| JP | 08-313803 A | 11/1996 |
| JP | 2004-029641 A | 1/2004 |
| JP | 2004-302059 A | 10/2004 |
| JP | 2005-091513 A | 4/2005 |
| JP | 2007-086308 A | 4/2007 |
| JP | 2008-076953 A | 4/2008 |
| JP | 2009-163256 A | 7/2009 |
| JP | 2009-186791 A | 8/2009 |

* cited by examiner

SINGLE FOCAL LENGTH LENS SYSTEM, INTERCHANGEABLE LENS APPARATUS AND CAMERA SYSTEM

RELATED APPLICATIONS

This application is the Continuation of International Application No. PCT/JP2011/004403, filed on Aug. 3, 2011, which in turn claims the benefit of Japanese Application No. 2010-187820, filed on Aug. 25, 2010, the disclosures of which Applications are incorporated by reference herein.

BACKGROUND

1. Field

The present disclosure relates to single focal length lens systems, interchangeable lens apparatuses, and camera systems.

2. Description of the Related Art

In recent years, interchangeable-lens type digital camera systems (also referred to simply as "camera systems", hereinafter) have been spreading rapidly. Such a camera system includes: a camera body having an image sensor such as a CCD (Charge Coupled Device), a CMOS (Complementary Metal-Oxide Semiconductor) or the like; and an interchangeable lens apparatus including an imaging lens system for forming an optical image on a light acceptance surface of the image sensor.

The camera system uses an image sensor larger than an image sensor mounted in a compact digital camera, and therefore, can take high-sensitive and high-quality images. Further, the camera system realizes high-speed focusing and high-speed image processing after image taking, and easy replacement of an interchangeable lens apparatus in accordance with a desired scene.

An interchangeable lens apparatus including a single focal length lens system is popular because it is lightweight and compact and is capable of taking pictures having excellent background blur effect as compared with an interchangeable lens apparatus including a focal-length-variable zoom lens system. Accordingly, various kinds of single focal length lens systems usable as imaging lens systems in camera systems have conventionally been proposed, such as single focal length lens systems disclosed in Japanese Laid-Open Patent Publications Nos. 06-130291 and 2004-029641.

SUMMARY

The present disclosure provides a compact and lightweight single focal length lens system having excellent imaging performance, which can be appropriately used in a camera system, and realizes inner focusing capable of high-speed and silent focusing. Further, the present disclosure provides an interchangeable lens apparatus and a camera system which are compact and lightweight.

The novel concepts disclosed herein were achieved in order to solve the foregoing problems in the related art, and herein is disclosed:

a single focal length lens system, in order from an object side to an image side, comprising: at least a front lens unit which has positive optical power or negative optical power, and which does not move along an optical axis but is fixed in focusing from an infinity in-focus condition to a close-object in-focus condition;

a focusing lens unit which has positive optical power, and which moves along the optical axis in focusing; and a rear lens unit which has negative optical power, and which does not move along the optical axis but is fixed in focusing, wherein the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface, the rear lens unit is composed of one single lens element, and the following condition (2) is satisfied:

$$-0.5 < f_W/f_{GR} < -0.1 \qquad (2)$$

where $f_W$ is a focal length of the entire single focal length lens system in an infinity in-focus condition, and $f_{GR}$ is a focal length of the rear lens unit.

The novel concepts disclosed herein were achieved in order to solve the foregoing problems in the related art, and herein is disclosed:

an interchangeable lens apparatus comprising:

a single focal length lens system; and a lens mount section which is connectable to a camera body including an image sensor for receiving an optical image formed by the single focal length lens system and converting the optical image into an electric image signal, wherein the single focal length lens system, in order from an object side to an image side, comprises: at least a front lens unit which has positive optical power or negative optical power, and which does not move along an optical axis but is fixed in focusing from an infinity in-focus condition to a close-object in-focus condition;

a focusing lens unit which has positive optical power, and which moves along the optical axis in focusing; and a rear lens unit which has negative optical power, and which does not move along the optical axis but is fixed in focusing, in which the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface, the rear lens unit is composed of one single lens element, and the following condition (2) is satisfied:

$$-0.5 < f_W/f_{GR} < -0.1 \qquad (2)$$

where $f_W$ is a focal length of the entire single focal length lens system in an infinity in-focus condition, and $f_{GR}$ is a focal length of the rear lens unit.

The novel concepts disclosed herein were achieved in order to solve the foregoing problems in the related art, and herein is disclosed:

a camera system comprising:

an interchangeable lens apparatus including a single focal length lens system; and a camera body which is detachably connected to the interchangeable lens apparatus via a camera mount section, and includes an image sensor for receiving an optical image formed by the single focal length lens system and converting the optical image into an electric image signal, wherein the single focal length lens system, in order from an object side to an image side, comprises: at least a front lens unit which has positive optical power or negative optical power, and which does not move along an optical axis but is fixed in focusing from an infinity in-focus condition to a close-object in-focus condition;

a focusing lens unit which has positive optical power, and which moves along the optical axis in focusing; and a rear lens unit which has negative optical power, and which does not move along the optical axis but is fixed in focusing, in which the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface, the rear lens unit is composed of one single lens element, and the following condition (2) is satisfied:

$$-0.5 < f_W/f_{GR} < -0.1 \quad (2)$$

where $f_W$ is a focal length of the entire single focal length lens system in an infinity in-focus condition, and $f_{GR}$ is a focal length of the rear lens unit.

The single focal length lens system according to the present disclosure is compact and lightweight, has excellent imaging performance, can be appropriately used in a camera system, and realizes inner focusing capable of high-speed and silent focusing.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
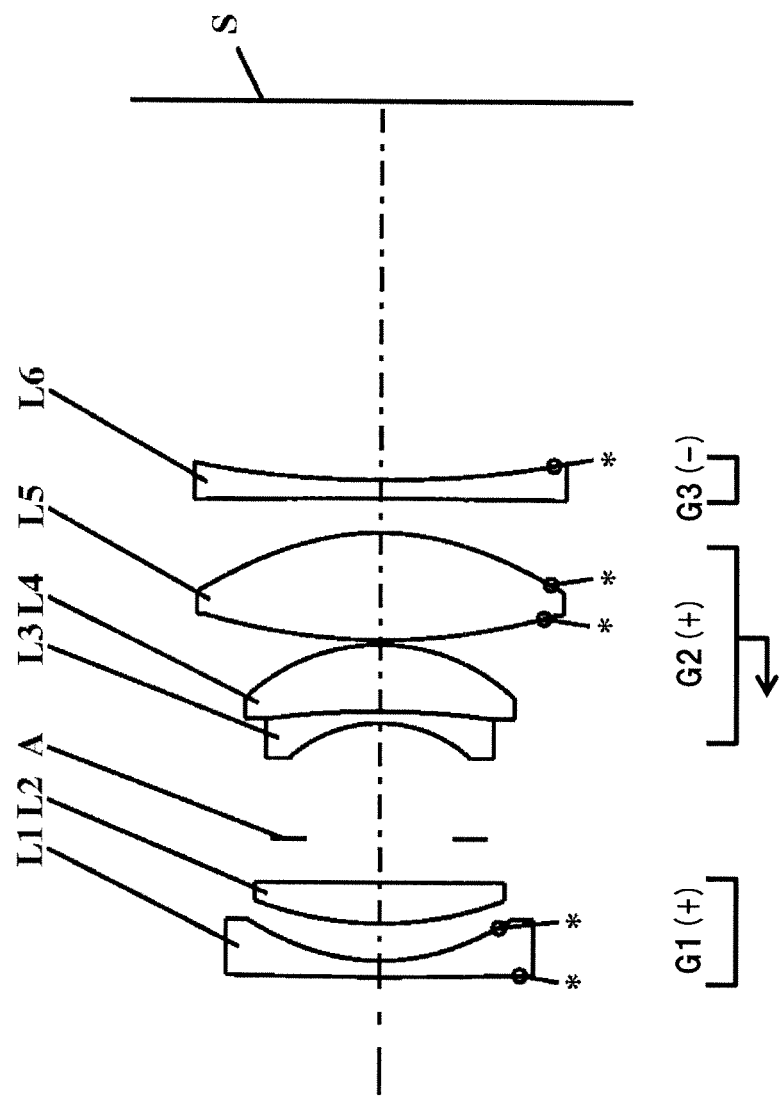
FIG. 1 is a lens arrangement diagram showing an infinity in-focus condition of a single focal length lens system according to Embodiment 1 (Numerical Example 1)
Figure 2:
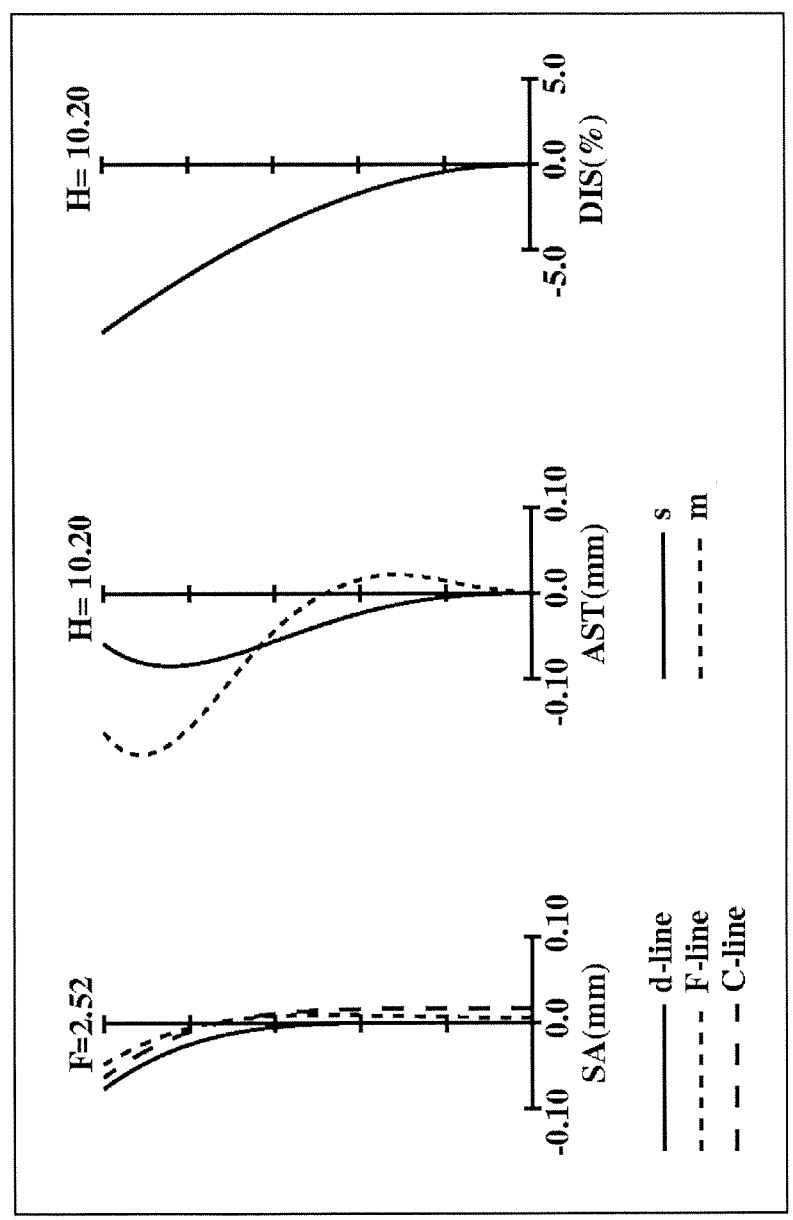
FIG. 2 is a longitudinal aberration diagram of an infinity in-focus condition of a single focal length lens system according to Numerical Example 1.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

FIGS. 1, 3, 5, 7, 9, 11, 13, 15, 17, and 19 are lens arrangement diagrams of single focal length lens systems according to Embodiments 1 to 10, respectively, and each of the single focal length lens systems is in an infinity in-focus condition.

In each Fig., an arrow imparted to a lens unit indicates focusing from an infinity in-focus condition to a close-object in-focus condition. That is, in FIGS. 1, 3, 5, 7, 9, and 11, the arrow indicates the moving direction of a focusing lens unit G2 described later, in focusing from an infinity in-focus condition to a close-object in-focus condition. In FIGS. 13, 15, 17, and 19, the arrow indicates the moving direction of a focusing lens unit G3 described later, in focusing from an infinity in-focus condition to a close-object in-focus condition.

In each Fig., an asterisk "*" imparted to a particular surface indicates that the surface is aspheric. In each Fig., symbol (+)

or (−) imparted to the symbol of each lens unit corresponds to the sign of the optical power of the lens unit. In each Fig., a straight line located on the most right-hand side indicates the position of an image surface S.

Each of the single focal length lens systems according to Embodiments 1 to 6, in order from the object side to the image side, comprises a front lens unit G1 having positive optical power or negative optical power, an aperture diaphragm A, a focusing lens unit G2 having positive optical power, and a rear lens unit G3 having negative optical power. The front lens unit G1 and the rear lens unit G3 do not move along the optical axis but are fixed in focusing from an infinity in-focus condition to a close-object in-focus condition. The focusing lens unit G2 moves along the optical axis in focusing to perform focusing.

Each of the single focal length lens systems according to Embodiments 7 to 10, in order from the object side to the image side, comprises a front lens unit G1 having positive optical power, an aperture diaphragm A, a lens unit G2 having positive optical power, a focusing lens unit G3 having positive optical power, and a rear lens unit G4 having negative optical power. The front lens unit G1, the lens unit G2, and the rear lens unit G4 do not move along the optical axis but are fixed in focusing from an infinity in-focus condition to a close-object in-focus condition. The focusing lens unit G3 moves along the optical axis in focusing to perform focusing.

Embodiment 1

As shown in FIG. 1, the front lens unit GE in order from the object side to the image side, comprises: a negative meniscus first lens element L1 with the convex surface facing the object side; and a positive meniscus second lens element L2 with the convex surface facing the object side. The first lens element L1 has two aspheric surfaces.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The rear lens unit G3 comprises solely a bi-concave sixth lens element L6 with the concave surface of greater curvature facing the image side. The sixth lens element L6 has an aspheric image side surface.

A flare-cut diaphragm is provided on the image side relative to the aperture diaphragm A. In the surface data of the corresponding Numerical Example described later, surface number 6 is imparted to the flare-cut diaphragm.

Embodiment 2

Figure 3:
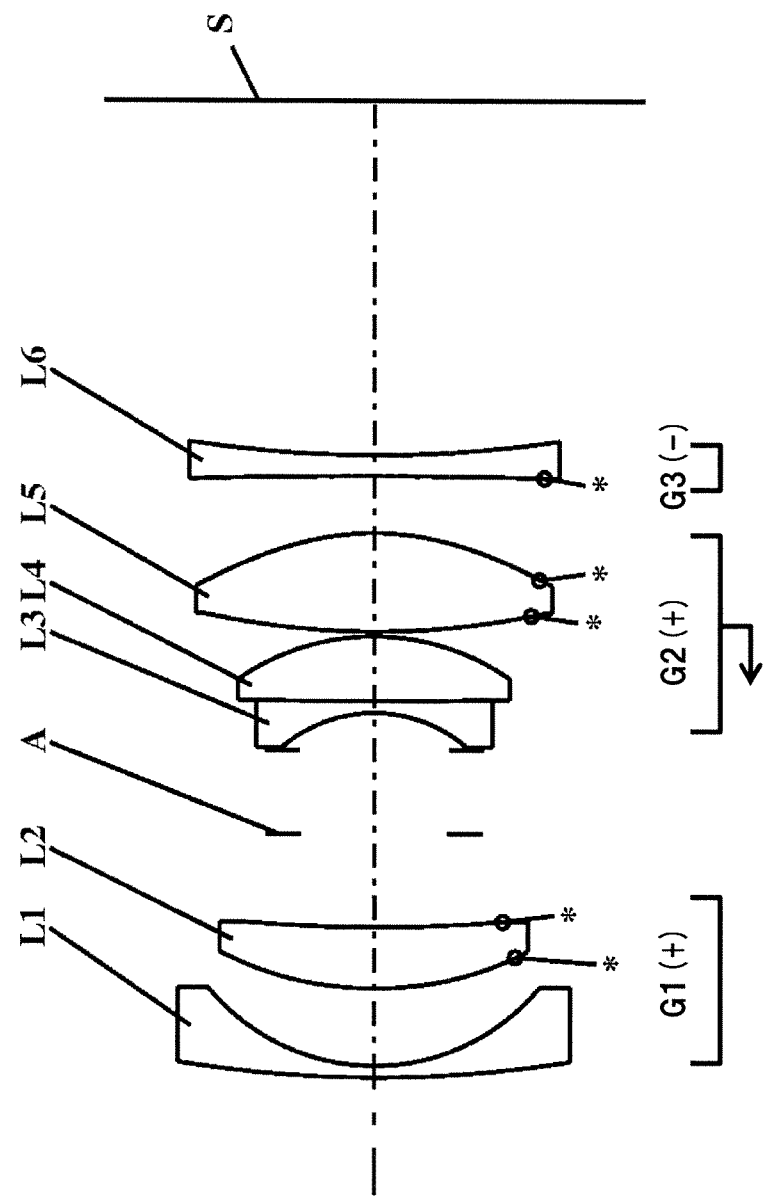
FIG. 3 is a lens arrangement diagram showing an infinity in-focus condition of a single focal length lens system according to Embodiment 2 (Numerical Example 2)
Figure 4:
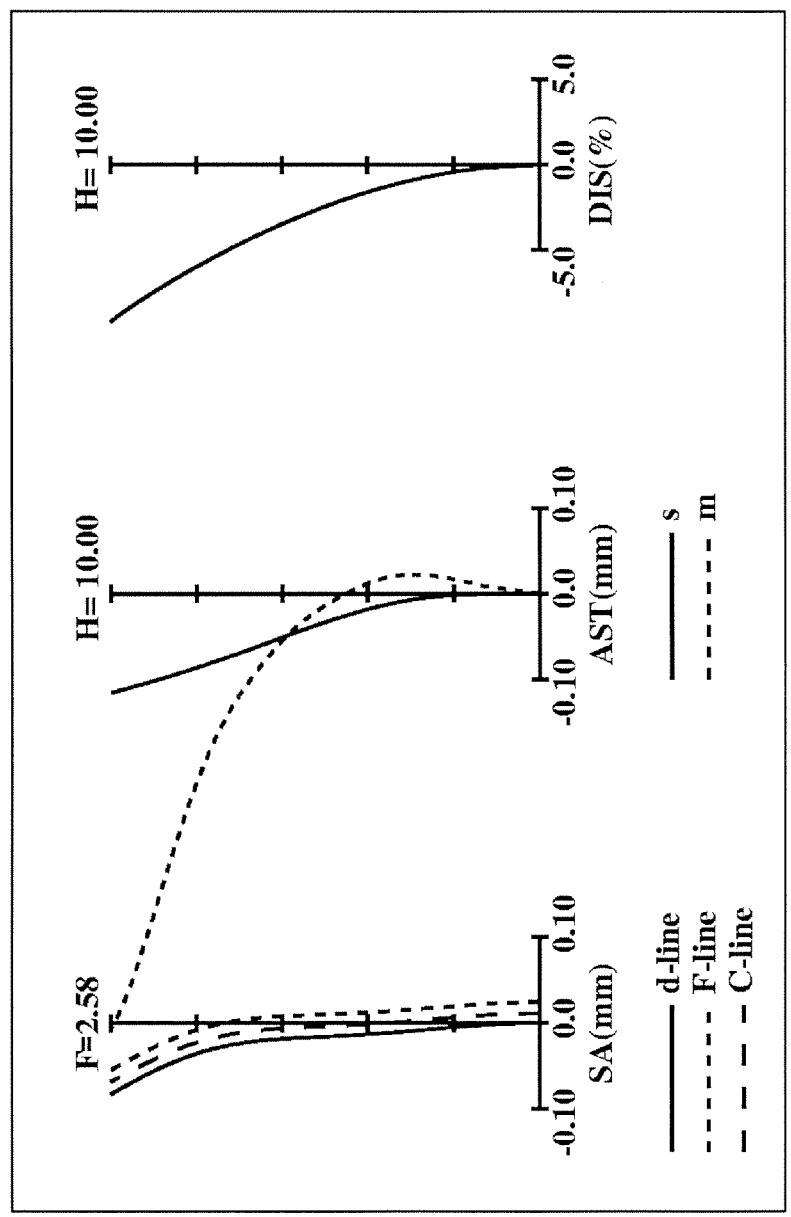
FIG. 4 is a longitudinal aberration diagram of an infinity in-focus condition of a single focal length lens system according to Numerical Example 2.

As shown in FIG. 3, the front lens unit G1, in order from object side to the image side, comprises: a negative meniscus first lens element L1 with the convex surface facing the object side; and a positive meniscus second lens element L2 with the convex surface facing the object side. The second lens element L2 has two aspheric surfaces.

The focusing lens unit G2, in order from the object side to the image side, comprises: a bi-concave third lens element L3 with the concave surface of greater curvature facing the object side; a bi-convex fourth lens element L4 with the convex surface of greater curvature facing the image side; and a bi-convex fifth lens element L5 with the convex surface of greater curvature facing the image side. The third lens element L3 and the fourth lens element L4 are cemented with each other. The fifth lens element L5 has two aspheric surfaces.

The rear lens unit G3 comprises solely a bi-concave sixth lens element L6 with the concave surface of greater curvature facing the image side. The sixth lens element L6 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 3

Figure 5:
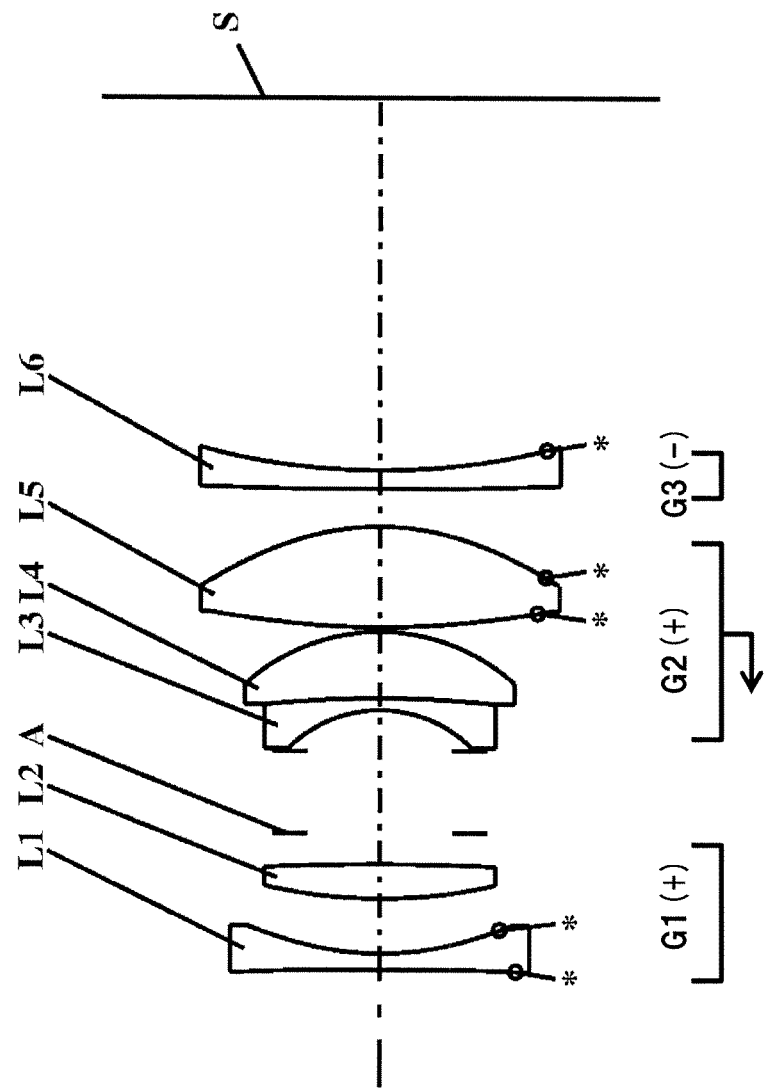
FIG. 5 is a lens arrangement diagram showing an infinity in-focus condition of a single focal length lens system according to Embodiment 3 (Numerical Example 3)
Figure 6:
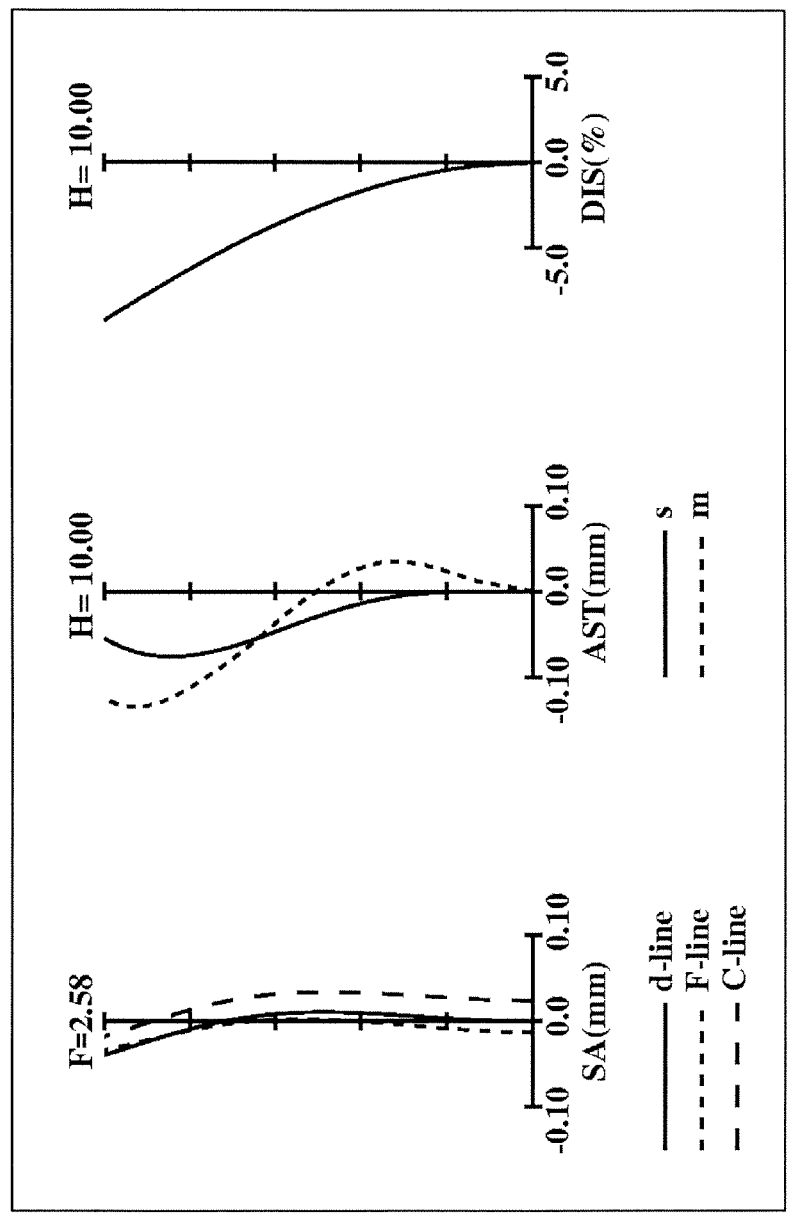
FIG. 6 is a longitudinal aberration diagram of an infinity in-focus condition of a single focal length lens system according to Numerical Example 3.

As shown in FIG. 5, the front lens unit G1, in order from the object side to the image side, comprises: a bi-concave first lens element L1 with the concave surface of greater curvature facing the image side; and a bi-convex second lens element L2 with the convex surface of greater curvature facing the object side. The first lens element L1 has two aspheric surfaces.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The rear lens unit G3 comprises solely a negative meniscus sixth lens element L6 with the convex surface facing the object side. The sixth lens element L6 has an aspheric image side surface.

A flare-cut diaphragm is provided on the image side relative to the aperture diaphragm A. In the surface data of the corresponding Numerical Example described later, surface number 6 is imparted to the flare-cut diaphragm.

Embodiment 4

Figure 7:
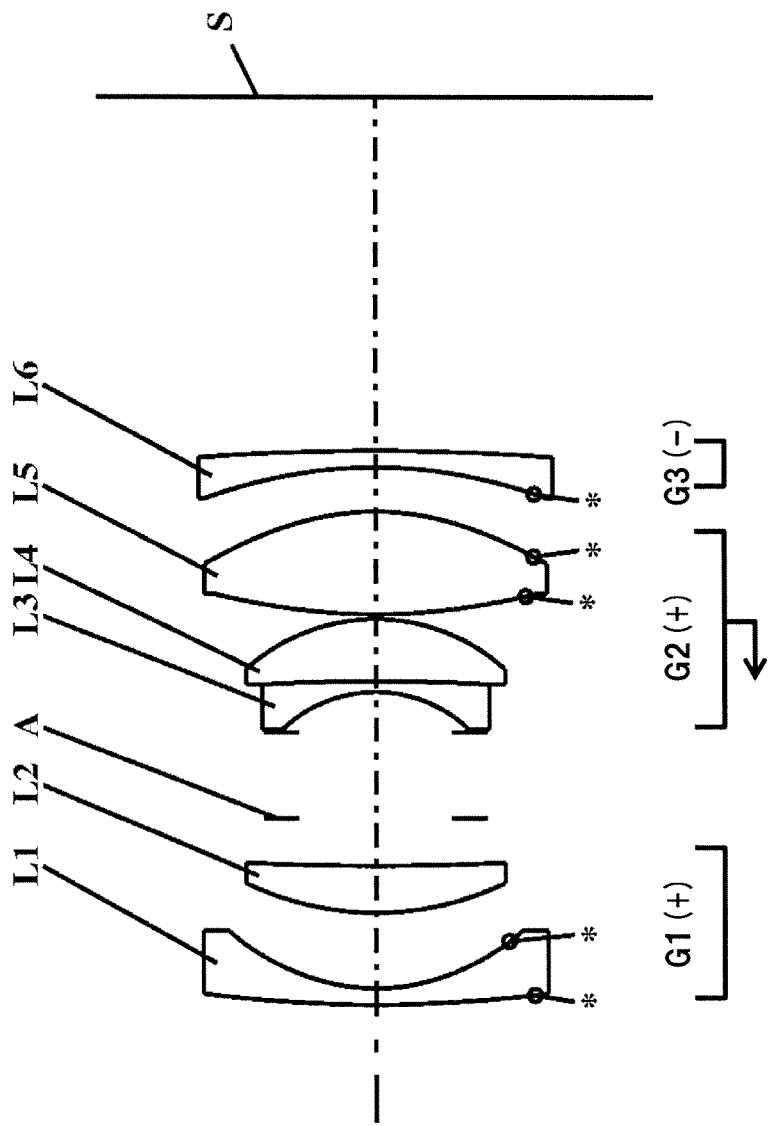
FIG. 7 is a lens arrangement diagram showing an infinity in-focus condition of a single focal length lens system according to Embodiment 4 (Numerical Example 4)
Figure 8:
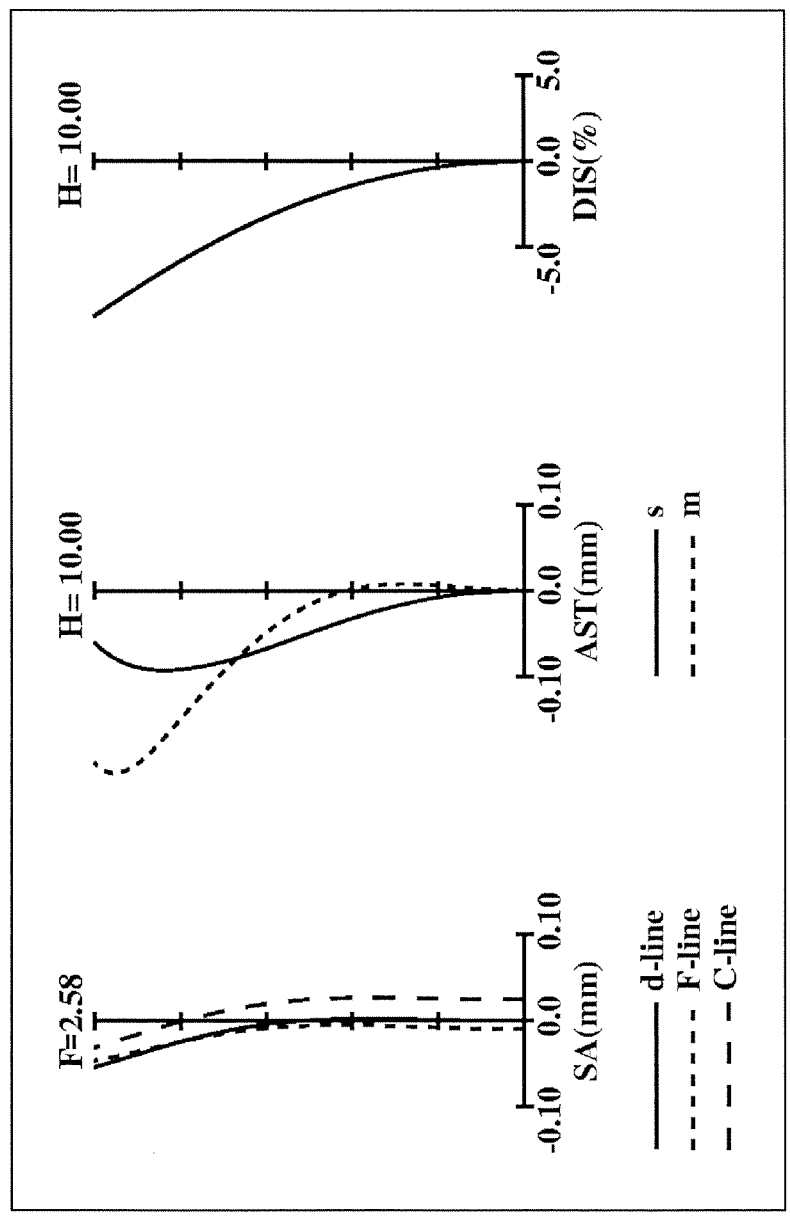
FIG. 8 is a longitudinal aberration diagram of an infinity in-focus condition of a single focal length lens system according to Numerical Example 4.

As shown in FIG. 7, the front lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

The focusing lens unit G2, in order from the object side to the image side, comprises: a negative meniscus third lens element L3 with the convex surface facing the image side; a positive meniscus fourth lens element L4 with the convex surface facing the image side; and a bi-convex fifth lens element L5 with the convex surface of greater curvature facing the image side. The third lens element L3 and the fourth lens element L4 are cemented with each other. In the surface data of the corresponding Numerical Example described later, surface number 8 is imparted to an adhesive layer between the third lens element L3 and the fourth lens element L4. The fifth lens element L5 has two aspheric surfaces.

The rear lens unit G3 comprises solely a negative meniscus sixth lens element L6 with the convex surface facing the image side. The sixth lens element L6 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 5

Figure 9:
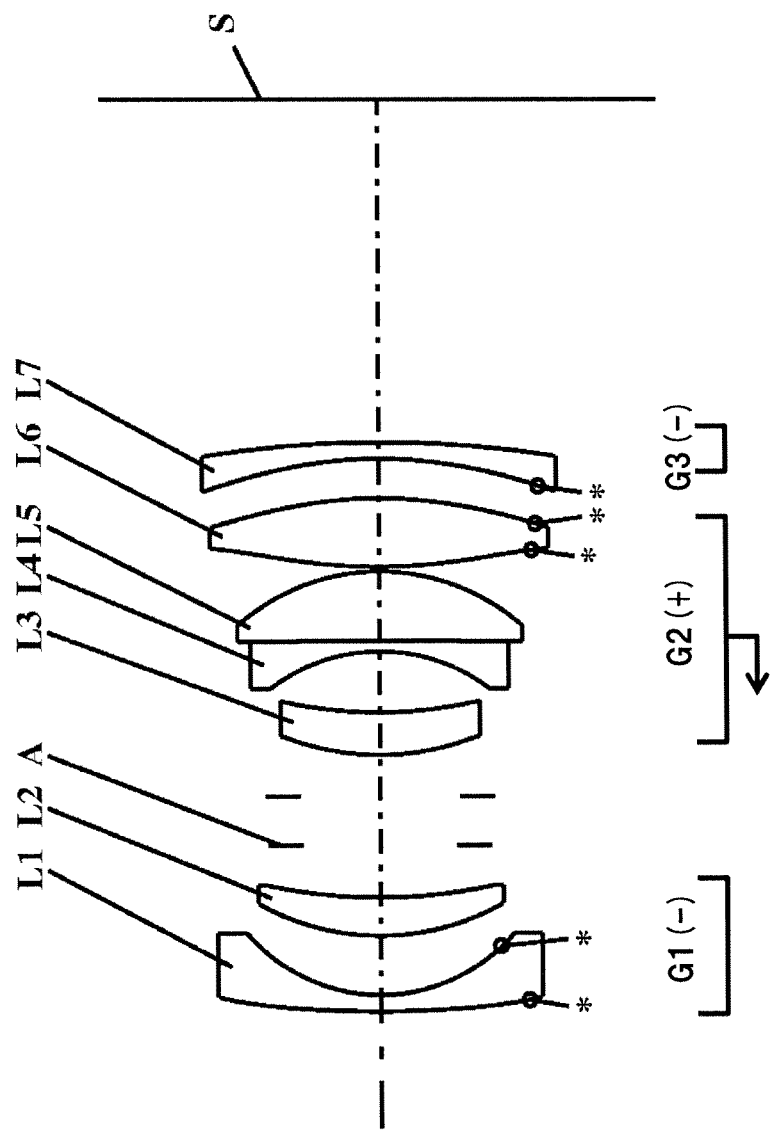
FIG. 9 is a lens arrangement diagram showing an infinity in-focus condition of a single focal length lens system according to Embodiment 5 (Numerical Example 5)
Figure 10:
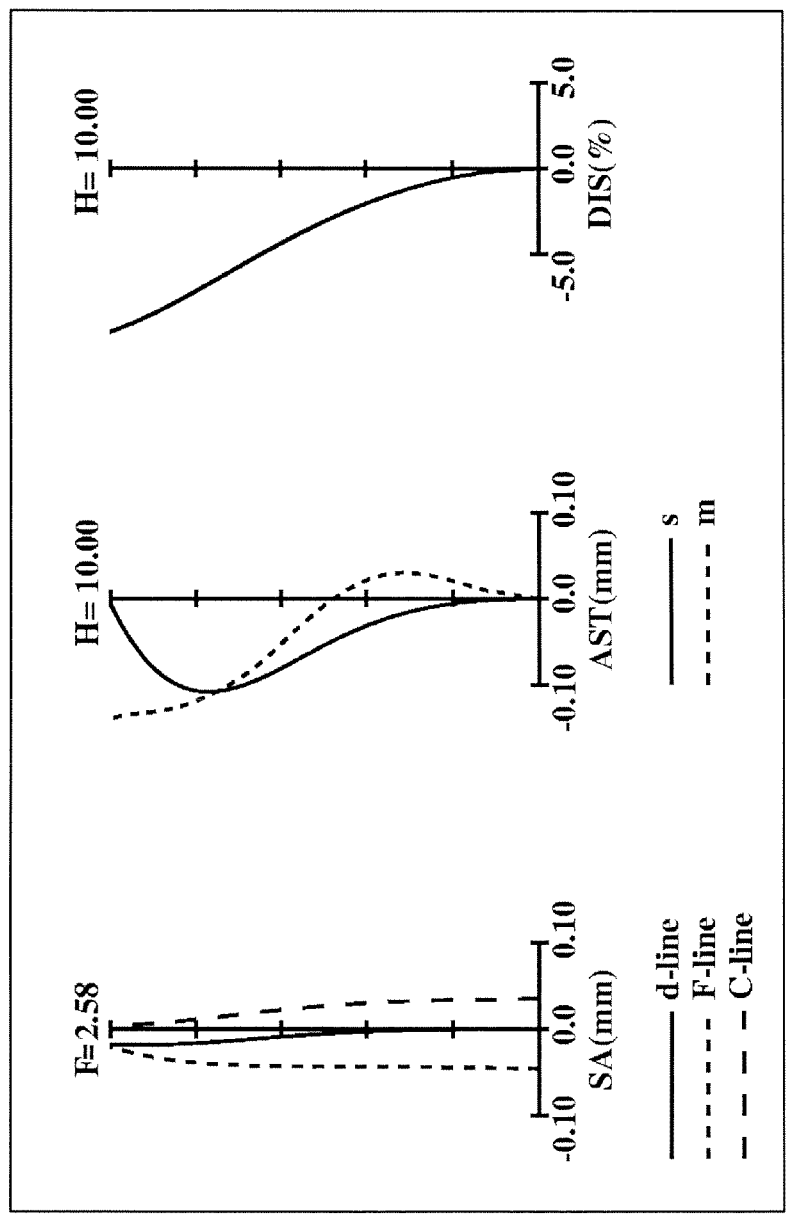
FIG. 10 is a longitudinal aberration diagram of an infinity in-focus condition of a single focal length lens system according to Numerical Example 5.

As shown in FIG. 9, the front lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

The focusing lens unit G2, in order from the object side to the image side, comprises: a positive meniscus third lens element L3 with the convex surface facing the object side; a negative meniscus fourth lens element L4 with the convex surface facing the image side; a positive meniscus fifth lens element L5 with the convex surface facing the image side; and a bi-convex sixth lens element L6 with the convex surface of greater curvature facing the image side. The fourth lens element L4 and the fifth lens element L5 are cemented with each other. In the surface data of the corresponding Numerical Example described later, surface number 10 is imparted to an adhesive layer between the fourth lens element L4 and the fifth lens element L5. The sixth lens element L6 has two aspheric surfaces.

The rear lens unit G3 comprises solely a negative meniscus seventh lens element L7 with the convex surface facing the image side. The seventh lens element L7 has an aspheric object side surface.

A flare-cut diaphragm is provided on the image side relative to the aperture diaphragm A. In the surface data of the corresponding Numerical Example described later, surface number 6 is imparted to the flare-cut diaphragm.

Embodiment 6

Figure 11:
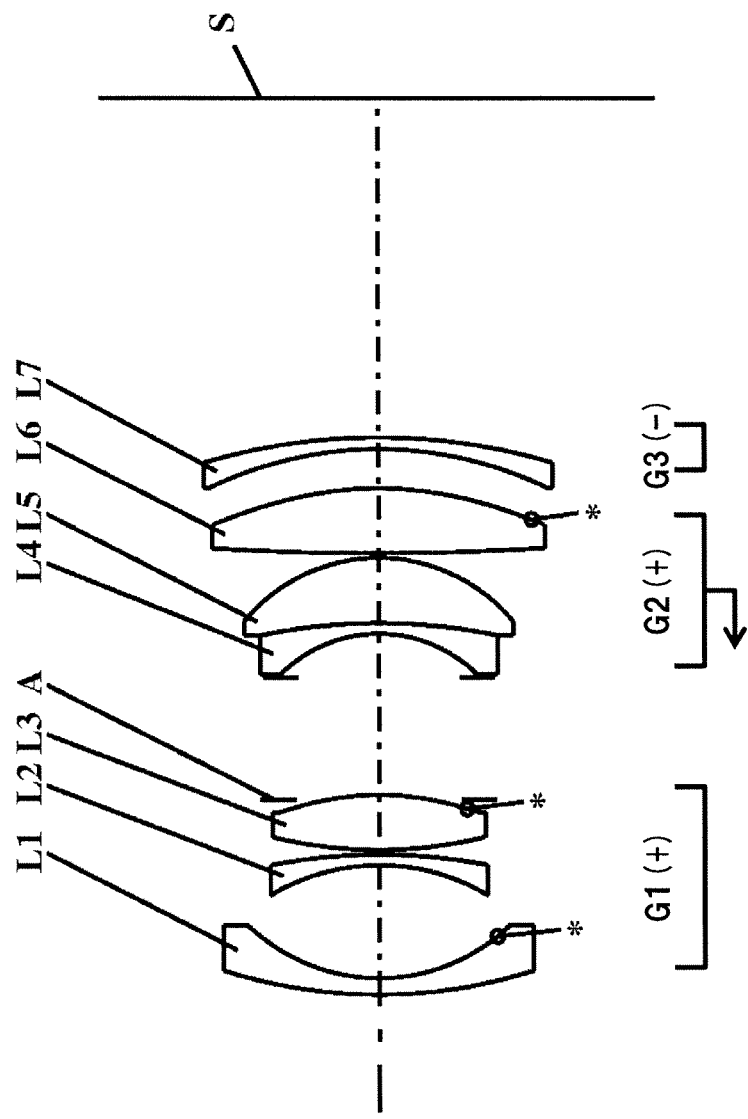
FIG. 11 is a lens arrangement diagram showing an infinity in-focus condition of a single focal length lens system according to Embodiment 6 (Numerical Example 6)
Figure 12:
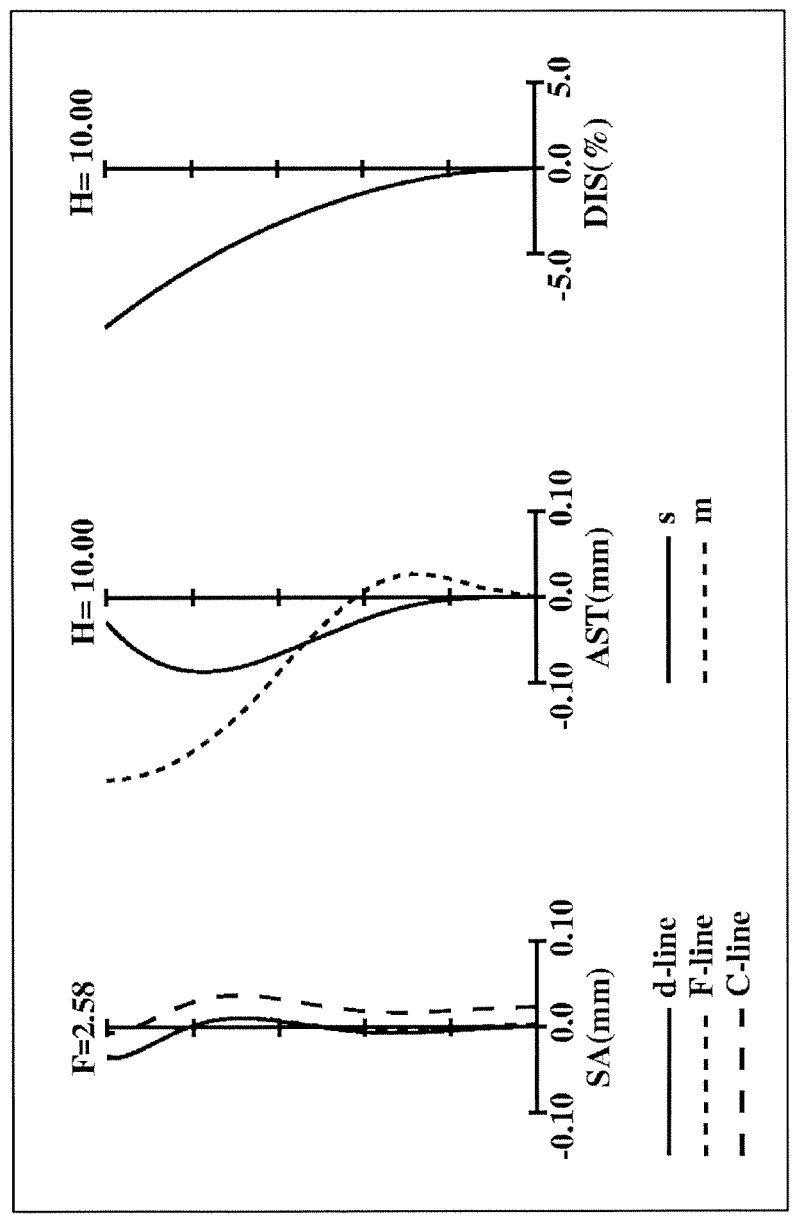
FIG. 12 is a longitudinal aberration diagram of an infinity in-focus condition of a single focal length lens system according to Numerical Example 6.

As shown in FIG. 11, the front lens unit G1, in order from the object side to the image side, comprises: a negative meniscus first lens element L1 with the convex surface facing the object side; a negative meniscus second lens element L2 with the convex surface facing the image side; and a bi-convex third lens element L3 with the convex surface of greater curvature facing the image side. The first lens element L1 has an aspheric image side surface, and the third lens element L3 has an aspheric image side surface.

The focusing lens unit G2, in order from the object side to the image side, comprises: a negative meniscus fourth lens element L4 with the convex surface facing the image side; a positive meniscus fifth lens element L5 with the convex surface facing the image side; and a bi-convex sixth lens element L6 with the convex surface of greater curvature facing the image side. The fourth lens element L4 and the fifth lens element L5 are cemented with each other. In the surface data of the corresponding Numerical Example described later, surface number 10 is imparted to an adhesive layer between the fourth lens element L4 and the fifth lens element L5. The sixth lens element L6 has an aspheric image side surface.

The rear lens unit G3 comprises solely a negative meniscus seventh lens element L7 with the convex surface facing the image side.

A flare-cut diaphragm is provided on the image side relative to the aperture diaphragm A. In the surface data of the corresponding Numerical Example described later, surface number 8 is imparted to the flare-cut diaphragm.

Embodiment 7

Figure 13:
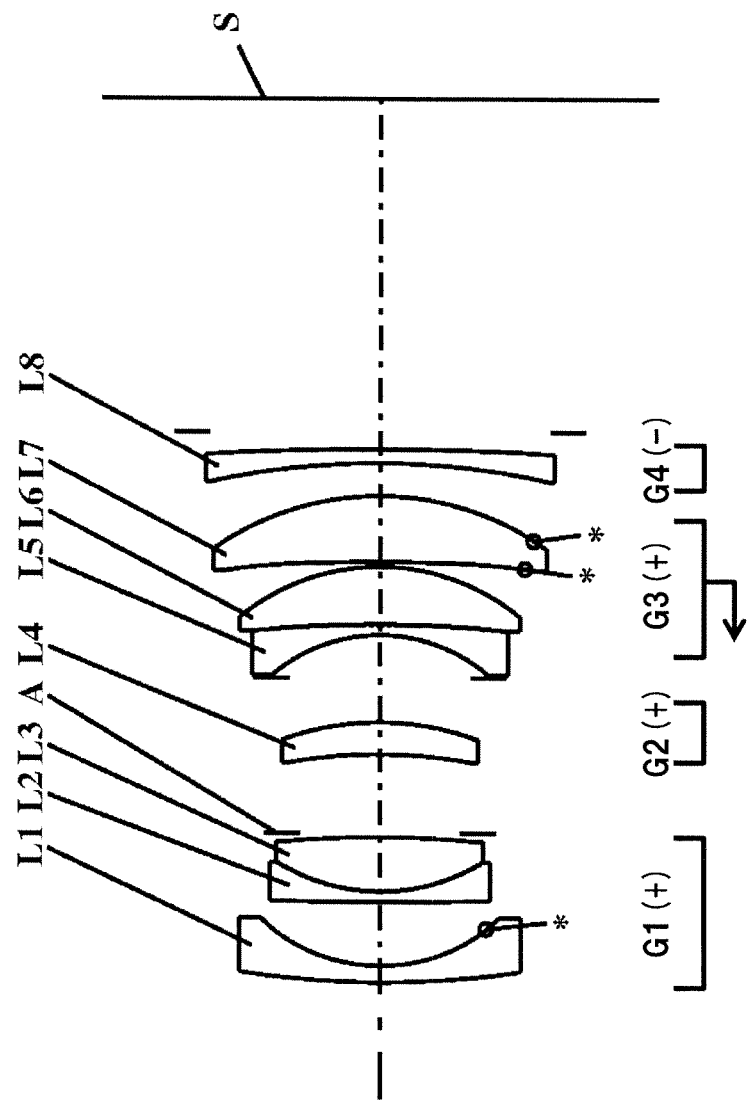
FIG. 13 is a lens arrangement diagram showing an infinity in-focus condition of a single focal length lens system according to Embodiment 7 (Numerical Example 7)
Figure 14:
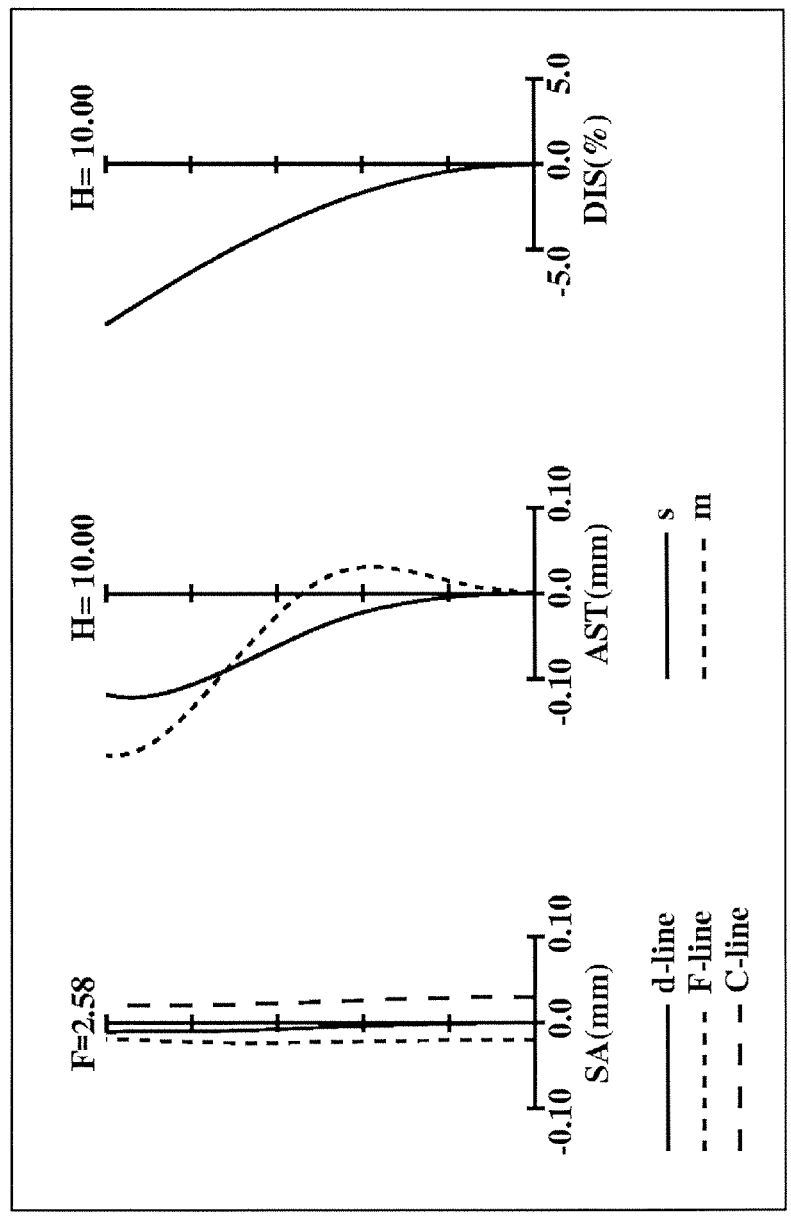
FIG. 14 is a longitudinal aberration diagram of an infinity in-focus condition of a single focal length lens system according to Numerical Example 7.

As shown in FIG. 13, the front lens unit G1, in order from the object side to the image side, comprises: a negative meniscus first lens element L1 with the convex surface facing the object side; a negative meniscus second lens element L2 with the convex surface facing the object side; and a bi-convex third lens element L3 with the convex surface of greater curvature facing the object side. The second lens element L2 and the third lens element L3 are cemented with each other. In the surface data of the corresponding Numerical Example described later, surface number 4 is imparted to an adhesive layer between the second lens element L2 and the third lens element L3. The first lens element L1 has an aspheric image side surface.

The lens unit G2 comprises solely a positive meniscus fourth lens element L4 with the convex surface facing the image side.

The focusing lens unit G3, in order from the object side to the image side, comprises: a negative meniscus fifth lens element L5 with the convex surface facing the image side; a positive meniscus sixth lens element L6 with the convex surface facing the image side; and a positive meniscus seventh lens element L7 with the convex surface facing the image side. The fifth lens element L5 and the sixth lens element L6 are cemented with each other. In the surface data of the corresponding Numerical Example described later, surface number 12 is imparted to an adhesive layer between the fifth lens element L5 and the sixth lens element L6. The seventh lens element L7 has two aspheric surfaces.

The rear lens unit G4 comprises solely a negative meniscus eighth lens element L8 with the convex surface facing the image side.

Two flare-cut diaphragms are provided on the image side relative to the aperture diaphragm A. In the surface data of the corresponding Numerical Example described later, surface numbers 10 and 19 are imparted to the flare-cut diaphragms.

Embodiment 8

Figure 15:
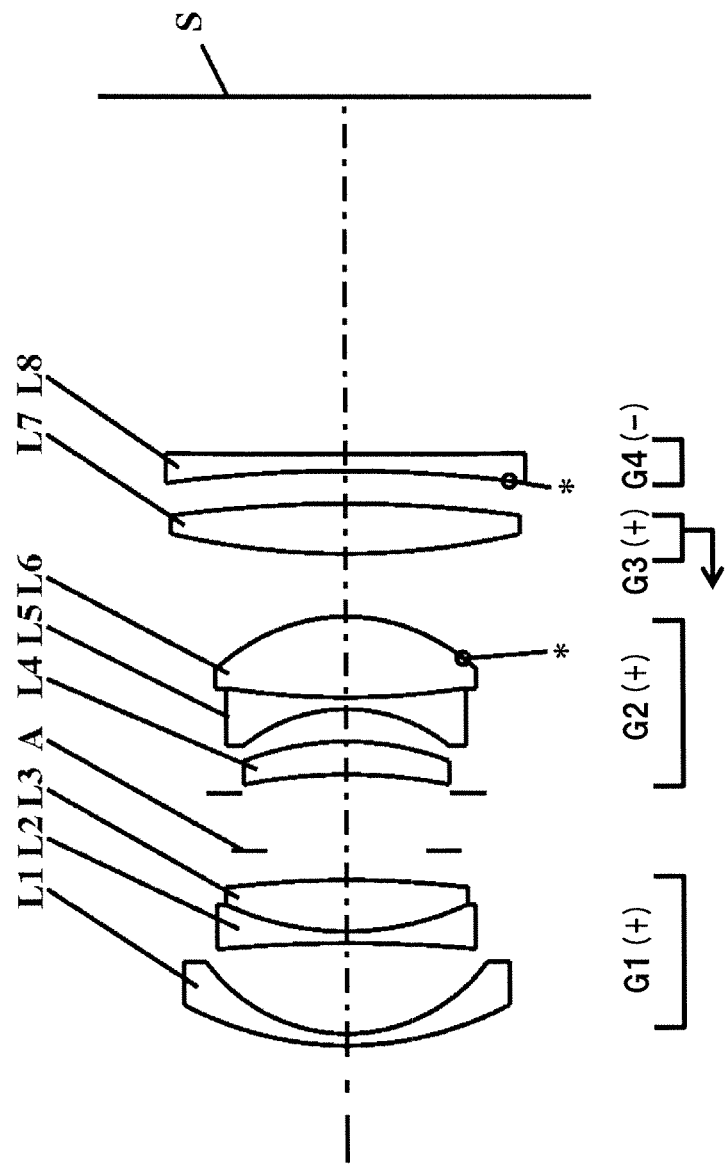
FIG. 15 is a lens arrangement diagram showing an infinity in-focus condition of a single focal length lens system according to Embodiment 8 (Numerical Example 8)
Figure 16:
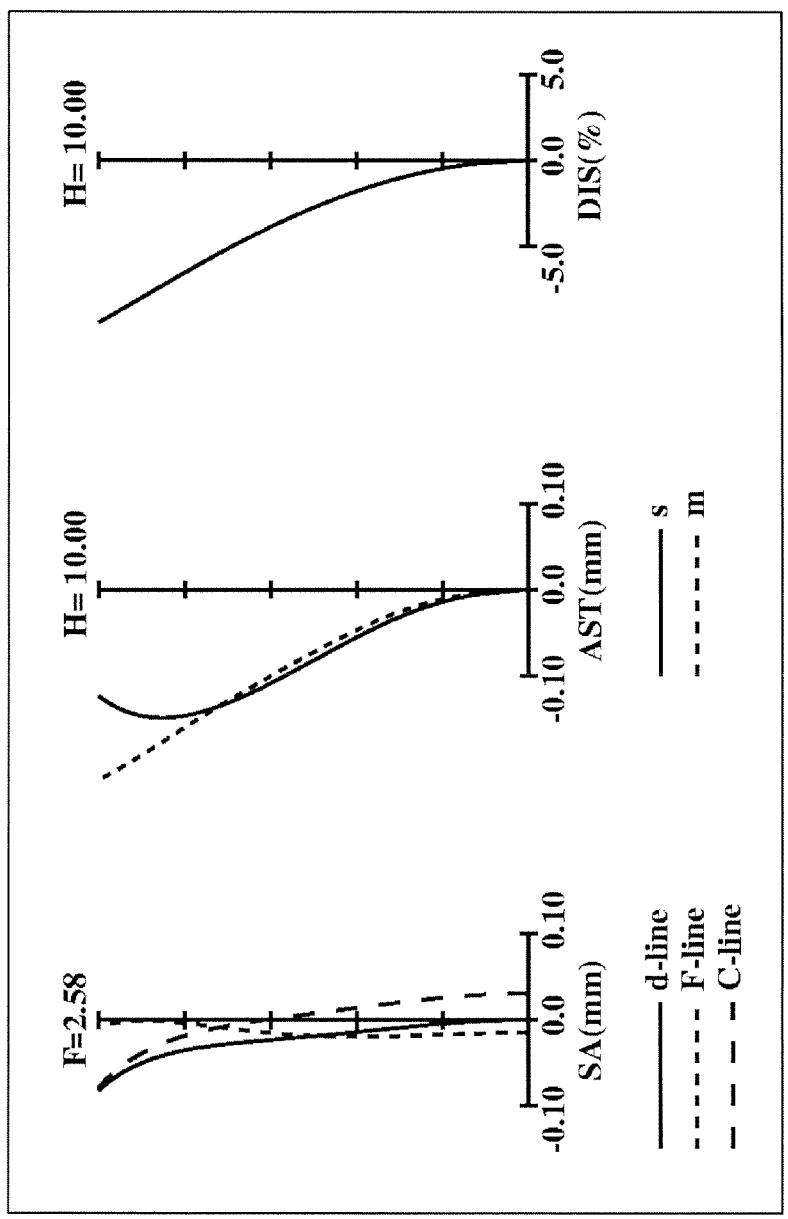
FIG. 16 is a longitudinal aberration diagram of an infinity in-focus condition of a single focal length lens system according to Numerical Example 8.

As shown in FIG. 15, the front lens unit G1, in order from the object side to the image side, comprises: a negative meniscus first lens element L1 with the convex surface facing the object side; a bi-concave second lens element L2 with the concave surface of greater curvature facing the image side; and a bi-convex third lens element L3 with the convex surface of greater curvature facing the object side. The second lens element L2 and the third lens element L3 are cemented with each other.

The lens unit G2, in order from the object side to the image side, comprises: a positive meniscus fourth lens element L4 with the convex surface facing the image side; a bi-concave fifth lens element L5 with the concave surface of greater curvature facing the object side; and a bi-convex sixth lens element L6 with the convex surface of greater curvature facing the image side. The fifth lens element L5 and the sixth lens element L6 are cemented with each other. The sixth lens element L6 has an aspheric image side surface.

The focusing lens unit G3 comprises solely a bi-convex seventh lens element L7 with the convex surface of greater curvature facing the object side.

The rear lens unit G4 comprises solely a bi-concave eighth lens element L8 with the concave surface of greater curvature facing the object side.

A flare-cut diaphragm is provided on the image side relative to the aperture diaphragm A. In the surface data of the corresponding Numerical Example described later, surface number 7 is imparted to the flare-cut diaphragm.

Embodiment 9

Figure 17:
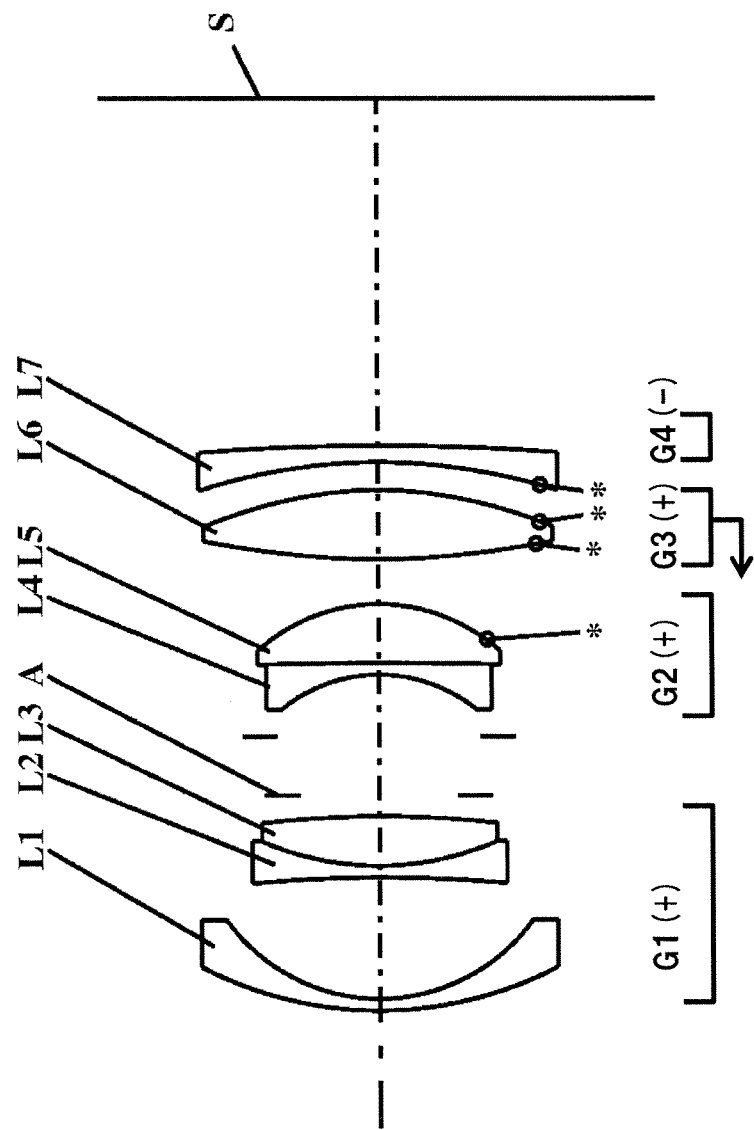
FIG. 17 is a lens arrangement diagram showing an infinity in-focus condition of a single focal length lens system according to Embodiment 9 (Numerical Example 9)
Figure 18:
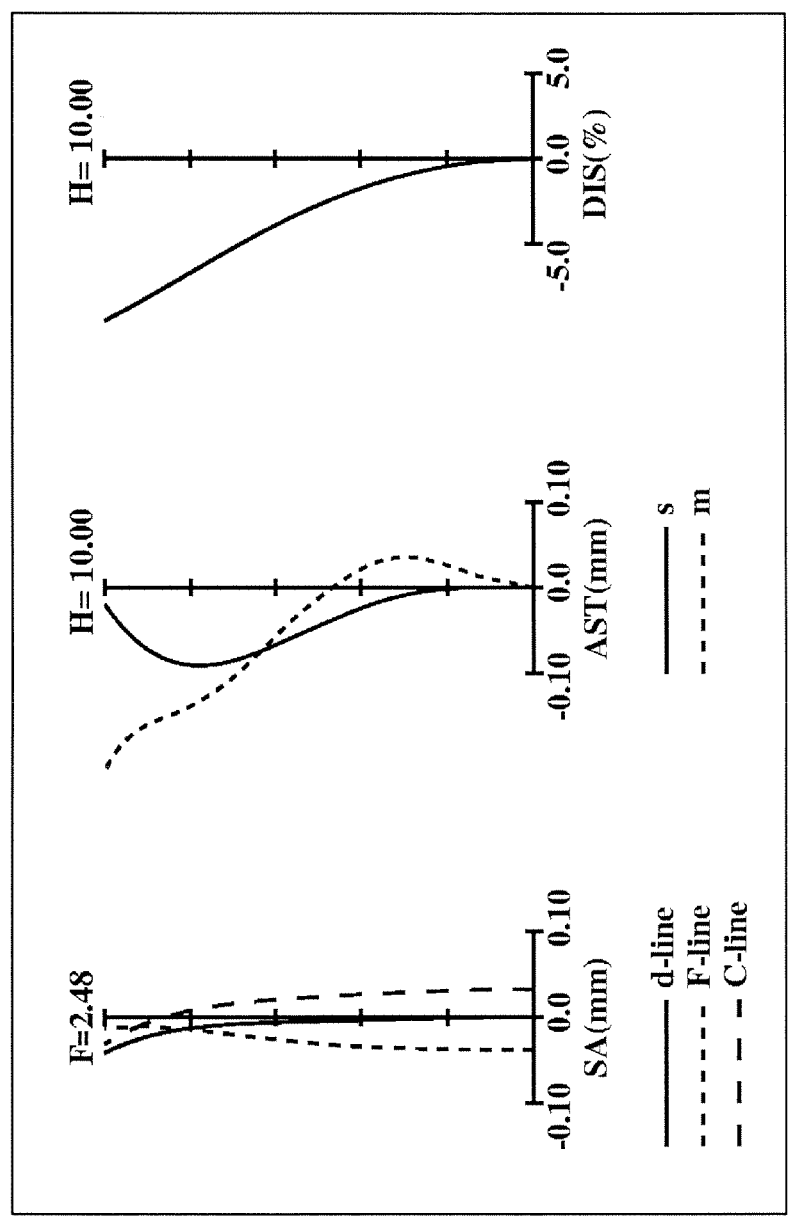
FIG. 18 is a longitudinal aberration diagram of an infinity in-focus condition of a single focal length lens system according to Numerical Example 9.

As shown in FIG. 17, the front lens unit G1, in order from the object side to the image side, comprises: a negative meniscus first lens element L1 with the convex surface facing the object side; a bi-concave second lens element L2 with the concave surface of greater curvature facing the image side; and a bi-convex third lens element L3 with the convex surface of greater curvature facing the object side. The second lens element L2 and the third lens element L3 are cemented with each other.

The lens unit G2, in order from the object side to the image side, comprises: a negative meniscus fourth lens element L4 with the convex surface facing the image side; and a positive meniscus fifth lens element L5 with the convex surface facing the image side. The fourth lens element L4 and the fifth lens element L5 are cemented with each other. The fifth lens element L5 has an aspheric image side surface.

The focusing lens unit G3 comprises solely a bi-convex sixth lens element L6 with the convex surface of greater curvature facing the image side. The sixth lens element L6 has two aspheric surfaces.

The rear lens unit G4 comprises solely a negative meniscus seventh lens element L7 with the convex surface facing the image side. The seventh lens element L7 has an aspheric object side surface.

A flare-cut diaphragm is provided on the image side relative to the aperture diaphragm A. In the surface data of the corresponding Numerical Example described later, surface number 7 is imparted to the flare-cut diaphragm.

Embodiment 10

Figure 19:
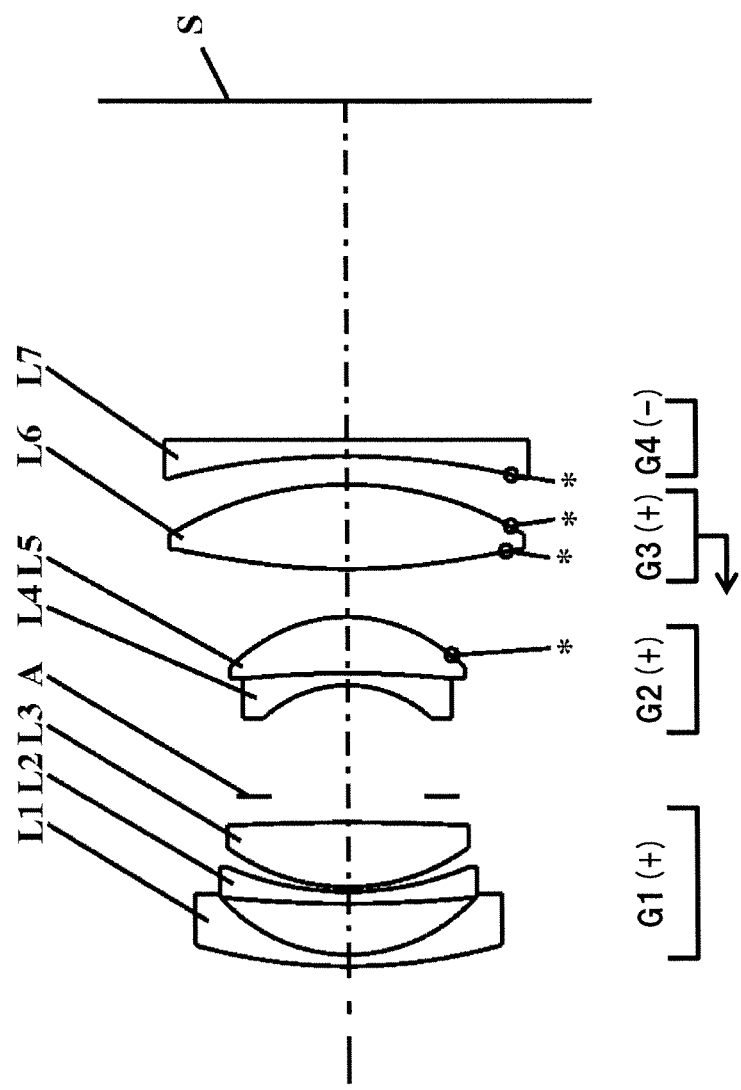
FIG. 19 is a lens arrangement diagram showing an infinity in-focus condition of a single focal length lens system according to Embodiment 10 (Numerical Example 10)
Figure 20:
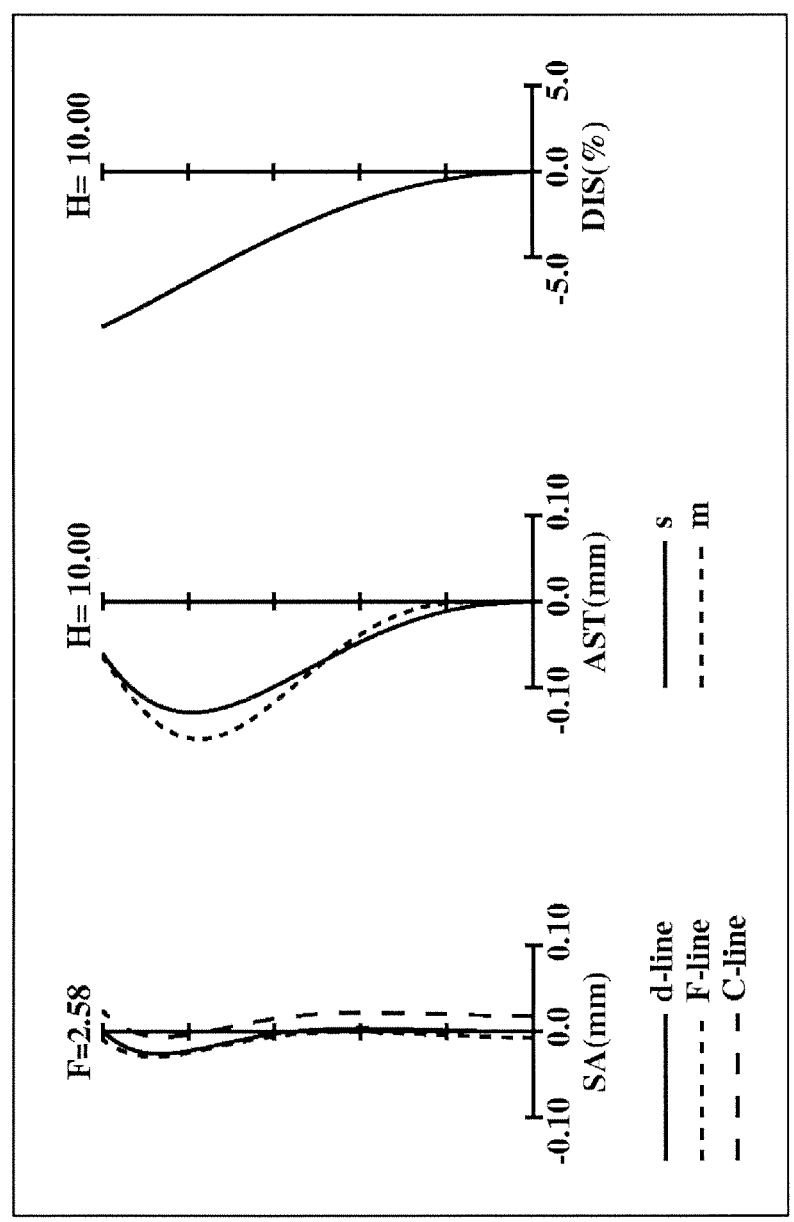
FIG. 20 is a longitudinal aberration diagram of an infinity in-focus condition of a single focal length lens system according to Numerical Example 10.

As shown in FIG. 19, the front lens unit G1, in order from the object side to the image side, comprises: a negative meniscus first lens element L1 with the convex surface facing the object side; a negative meniscus second lens element L2 with the convex surface facing the object side; and a bi-convex third lens element L3 with the convex surface of greater curvature facing the object side.

The lens unit G2, in order from the object side to the image side, comprises: a negative meniscus fourth lens element L4 with the convex surface facing the image side; and a positive meniscus fifth lens element L5 with the convex surface facing the image side. The fourth lens element L4 and the fifth lens element L5 are cemented with each other. In the surface data of the corresponding Numerical Example described later, surface number 9 is imparted to an adhesive layer between the fourth lens element L4 and the fifth lens element L5. The fifth lens element L5 has an aspheric image side surface.

The focusing lens unit G3 comprises solely a bi-convex sixth lens element L6 with the convex surface of greater curvature facing the image side. The sixth lens element L6 has two aspheric surfaces.

The rear lens unit G4 comprises solely a plano-concave seventh lens element L7 with the concave surface facing the object side. The seventh lens element L7 has an aspheric object side surface.

The following description is given for beneficial conditions that a single focal length lens system like the single focal length lens systems according to Embodiments 1 to 10 can satisfy. Here, a plurality of beneficial conditions are set forth for the single focal length lens system according to each embodiment. A construction that satisfies all the plurality of conditions is most effective for the single focal length lens system. However, when an individual condition is satisfied, a single focal length lens system having the corresponding effect is obtained.

For example, in a single focal length lens system like the single focal length lens systems according to Embodiments 1 to 10, which comprises: at least, in order from the object side to the image side, a front lens unit which has positive optical power or negative optical power, and which does not move along an optical axis but is fixed in focusing from an infinity in-focus condition to a close-object in-focus condition; a focusing lens unit which has positive optical power, and which moves along the optical axis in focusing; and a rear lens unit which has negative optical power, and which does not move along the optical axis but is fixed in focusing, and in which the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface, and in which the rear lens unit is composed of one single lens element (this lens configuration is referred to as a basic configuration of the embodiments, hereinafter), the following condition (2) is satisfied.

$$-0.5 < f_W/f_{GR} < -0.1 \quad (2)$$

where $f_W$ is a focal length of the entire single focal length lens system in an infinity in-focus condition, and $f_{GR}$ is a focal length of the rear lens unit.

The condition (2) sets forth the relationship between the focal length of the entire single focal length lens system and the focal length of the rear lens unit. When the value exceeds the upper limit of the condition (2), effects for magnifying the image by the rear lens unit becomes insufficient, and thereby compensation of curvature of field in the peripheral part of the image becomes insufficient. As a result, performance in the peripheral part of the image deteriorates, and thereby the size of the lens system cannot be reduced. When the value goes below the lower limit of the condition (2), although the size reduction of the lens system can be expected due to effects for magnifying the image by the rear lens unit, the optical power of the focusing lens unit increases, and thereby deterioration sensitivity of optical performance to a manufacturing error increases. As a result, the level of manufacturing difficulty increases, which causes increase in the manufacturing cost.

When at least one of the following conditions (2-1)' and (2-1)" is satisfied, the above-mentioned effect is achieved more successfully.

$$-0.42 < f_W/f_{GR} \quad (2\text{-}1)'$$

$$f_W/f_{GR} < -0.15 \quad (2\text{-}1)''$$

Further, when at least one of the following conditions (2-2)' and (2-2)" is satisfied, the above-mentioned effect is achieved still more successfully.

$$-0.34 < f_W/f_{GR} \quad (2\text{-}2)'$$

$$f_W/f_{GR} < -0.20 \quad (2\text{-}2)''$$

It is beneficial that, in a single focal length lens system having the basic configuration like the single focal length lens systems according to Embodiments 1 to 10, the following condition (1) is satisfied.

$$1.25 < nd_R - 0.01 \times vd_R < 1.85 \qquad (1)$$

where $nd_R$ is a refractive index to the d-line of the single lens element constituting the rear lens unit, and $vd_R$ is an Abbe number to the d-line of the single lens element constituting the rear lens unit.

The condition (1) sets forth the relationship between the refractive index to the d-line of the single lens element constituting the rear lens unit and the Abbe number to the d-line of the single lens element constituting the rear lens unit. When the value exceeds the upper limit of the condition (1), compensation of chromatic aberration in the peripheral part of the image becomes excessive, and compensation of curvature of field in the peripheral part of the image becomes insufficient. As a result, performance in the peripheral part of the image deteriorates, and thereby the size of the lens system cannot be reduced. When the value goes below the lower limit of the condition (1), compensation of chromatic aberration in the peripheral part of the image becomes insufficient, and compensation of curvature of field in the peripheral part of the image becomes excessive. As a result, also performance in the peripheral part of the image deteriorates, and thereby the size of the lens system cannot be reduced.

When at least one of the following conditions (1-1)' and (1-1)" is satisfied, the above-mentioned effect is achieved more successfully.

$$1.30 < nd_R - 0.01 \times vd_R \qquad (1\text{-}1)'$$

$$nd_R - 0.01 \times vd_R < 1.75 \qquad (1\text{-}1)''$$

Further, when at least one of the following conditions (1-2)' and (1-2)" is satisfied, the above-mentioned effect is achieved still more successfully.

$$1.35 < nd_R - 0.01 \times vd_R \qquad (1\text{-}2)'$$

$$nd_R - 0.01 \times vd_R < 1.65 \qquad (1\text{-}2)''$$

It is beneficial that, in a single focal length lens system having the basic configuration like the single focal length lens systems according to Embodiments 1 to 10, the following condition (3) is satisfied.

$$0.4 < f_W/f_{GF} < 1.5 \qquad (3)$$

where $f_W$ is a focal length of the entire single focal length lens system in an infinity in-focus condition, and $f_{GF}$ is a focal length of the focusing lens unit.

The condition (3) sets forth the relationship between the focal length of the entire single focal length lens system and the focal length of the focusing lens unit. When the value exceeds the upper limit of the condition (3), the optical power of the focusing lens unit increases, and thereby deterioration sensitivity of optical performance to a manufacturing error increases. As a result, the level of manufacturing difficulty increases, which causes increase in the manufacturing cost. When the value goes below the lower limit of the condition (3), the amount of draw-out of the focusing lens unit becomes large, which causes increase in the overall length of the lens system.

When at least one of the following conditions (3-1)' and (3-1)" is satisfied, the above-mentioned effect is achieved more successfully.

$$0.60 < f_W/f_{GF} \qquad (3\text{-}1)'$$

$$f_W/f_{GF} < 1.35 \qquad (3\text{-}1)''$$

Further, when at least one of the following conditions (3-2)' and (3-2)" is satisfied, the above-mentioned effect is achieved still more successfully.

$$0.8 < f_W/f_{GF} \qquad (3\text{-}2)'$$

$$f_W/f_{GF} < 1.2 \qquad (3\text{-}2)''$$

In the single focal length lens systems according to Embodiments 1 to 5, and 8 to 10, since the single lens element constituting the rear lens unit has at least one aspheric surface, astigmatism in the peripheral part of the image can be satisfactorily compensated with the thickness of the rear lens unit in the optical axis direction being reduced.

In the single focal length lens systems according to Embodiments 1 to 7, the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface. Therefore, axial chromatic aberration, magnification chromatic aberration, and coma aberration can be satisfactorily compensated from an infinity object point to a close object point, and thereby the performance of the entire screen is enhanced.

In the single focal length lens systems according to Embodiments 1 to 7, 9, and 10, since the focusing lens unit has at least one aspheric surface, spherical aberration and coma aberration can be satisfactorily compensated from an infinity object point to a close object point, and thereby the performance in the vicinity of the center of the screen is enhanced.

In the single focal length lens systems according to Embodiments 1 to 7, since the front lens unit has at least one aspheric surface, astigmatism in the peripheral part of the image can be satisfactorily compensated with the thickness of the front lens unit in the optical axis direction being reduced.

The individual lens units constituting the single focal length lens systems according to Embodiments 1 to 10 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium.

Although there are no clear descriptions in Embodiments 1 to 10, a plane parallel plate substantially having no optical power, such as an optical low-pass filter or a face plate of an image sensor, or a microlens array for increasing aperture efficiency of the image sensor can be provided between the image surface S and the lens system.

As described above, Embodiments 1 to 10 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

Embodiment 11

Figure 21:
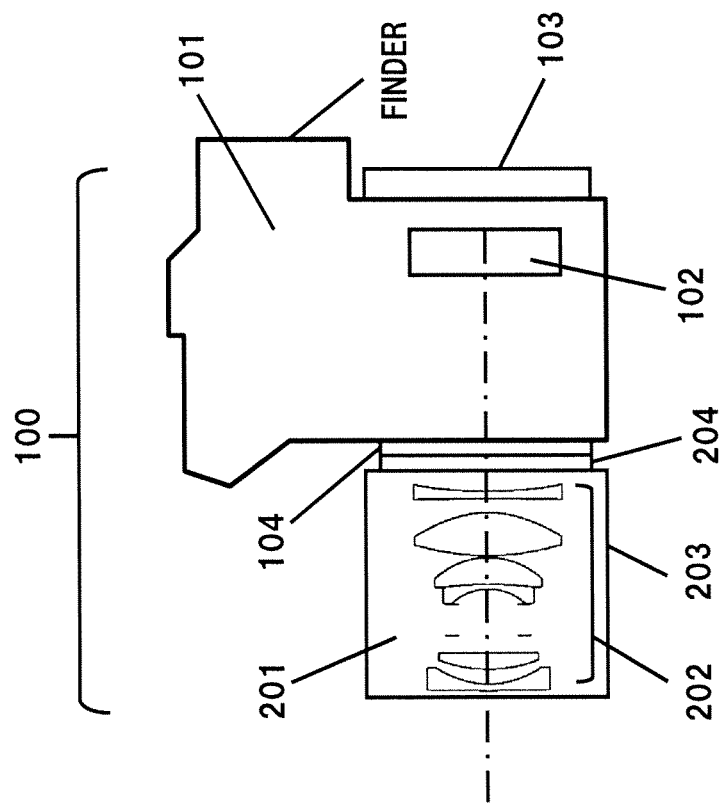
FIG. 21 is a schematic construction diagram of an interchangeable-lens type digital camera system according to Embodiment 11.

FIG. 21 is a schematic construction diagram of an interchangeable-lens type digital camera system according to Embodiment 11.

The interchangeable-lens type digital camera system 100 according to Embodiment 11 includes a camera body 101, and an interchangeable lens apparatus 201 which is detachably connected to the camera body 101.

The camera body 101 includes: an image sensor 102 which receives an optical image formed by a single focal length lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a single focal length lens system 202 according to any of Embodiments 1 to 10; a lens barrel 203 which holds the single focal length lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 21, the single focal length lens system according to Embodiment 1 is employed as the single focal length lens system 202.

In Embodiment 11, since the single focal length lens system 202 according to any of Embodiments 1 to 10 is employed, a compact interchangeable lens apparatus having excellent imaging performance can be realized at low cost. Moreover, size reduction and cost reduction of the entire camera system 100 according to Embodiment 11 can be achieved.

As described above, Embodiment 11 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the single focal length lens systems according to Embodiments 1 to 10 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is an n-th order aspherical coefficient.

FIGS. 2, 4, 6, 8, 10, 12, 14, 16, 18, and 20 are longitudinal aberration diagrams of an infinity in-focus condition of the single focal length lens systems according to Numerical Examples 1 to 10, respectively.

Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Numerical Example 1

The single focal length lens system of Numerical Example 1 corresponds to Embodiment 1 shown in FIG. 1. Table 1 shows the surface data of the single focal length lens system. Table 2 shows the aspherical data. Table 3 shows various data.

TABLE 1

(Surface data)

| Surface number | r | d | nd | vd | Effective diameter |
|---|---|---|---|---|---|
| Object surface | ∞ | | | | |
| 1* | 150.13690 | 0.70000 | 1.58332 | 59.1 | 6.069 |
| 2* | 9.13930 | 1.58250 | | | 5.160 |
| 3 | 14.91730 | 1.73000 | 1.91082 | 35.2 | 4.829 |
| 4 | 408.02380 | 1.86300 | | | 5.036 |
| 5(Diaphragm) | ∞ | 3.28380 | | | 3.110 |
| 6 | ∞ | 1.64960 | | | 3.100 |
| 7 | −5.73120 | 0.50000 | 1.84666 | 23.8 | 3.396 |
| 8 | −35.00000 | 0.01000 | 1.56732 | 42.8 | 4.346 |
| 9 | −35.00000 | 2.83000 | 1.88300 | 40.8 | 4.353 |
| 10 | −8.35190 | 0.20000 | | | 5.227 |
| 11* | 25.08330 | 4.58000 | 1.58250 | 59.4 | 7.073 |
| 12* | −10.86000 | 1.45000 | | | 7.371 |
| 13 | −611.69690 | 0.80000 | 1.68400 | 31.3 | 7.490 |
| 14* | 44.68010 | (BF) | | | 7.526 |
| Image surface | ∞ | | | | |

TABLE 2

(Aspherical data)

Surface No. 1

K = 0.00000E+00, A4 = −3.85000E−05, A6 = 1.82000E−06,
A8 = −9.53000E−08 A10 = 1.88000E−09, A12 = −1.12000E−11

Surface No. 2

K = 0.00000E+00, A4 = −1.30000E−04, A6 = −6.84000E−07,
A8 = −3.09000E−08 A10 = −2.92000E−09, A12 = 9.26000E−11

TABLE 2-continued (Aspherical data)

Surface No. 11

K = 0.00000E+00, A4 = −1.88000E−05, A6 = −7.59000E−07,
A8 = 2.03000E−08 A10 = −1.45000E−10, A12 = 0.00000E+00
Surface No. 12

K = 0.00000E+00, A4 = 2.69000E−04, A6 = −4.50000E−06,
A8 = 1.05000E−07 A10 = −1.05000E−09, A12 = 4.67000E−12
Surface No. 14

K = 0.00000E+00, A4 = −9.05000E−05, A6 = 4.19000E−06,
A8 = −8.41000E−08 A10 = 9.16000E−10, A12 = −4.09000E−12

TABLE 3

(Various data)

| | |
|---|---|
| Focal length | 14.5457 |
| F-number | 2.52134 |
| View angle | 37.8597 |
| Image height | 10.2000 |
| Overall length of lens system | 37.3188 |
| BF | 16.1399 |

Numerical Example 2

The single focal length lens system of Numerical Example 2 corresponds to Embodiment 2 shown in FIG. 3. Table 4 shows the surface data of the single focal length lens system. Table 5 shows the aspherical data. Table 6 shows various data.

TABLE 4

(Surface data)

| Surface number | r | d | nd | vd | Effective diameter |
|---|---|---|---|---|---|
| Object surface | ∞ | | | | |
| 1 | 51.95710 | 0.50000 | 1.48749 | 70.4 | 8.440 |
| 2 | 9.15460 | 3.31060 | | | 6.897 |
| 3* | 15.40980 | 2.62080 | 1.80825 | 40.9 | 6.410 |
| 4* | 68.26990 | 3.98100 | | | 6.249 |
| 5 (Diaphragm) | ∞ | 3.56320 | | | 3.123 |
| 6 | ∞ | 1.57460 | | | 3.188 |
| 7 | −6.12570 | 0.50000 | 1.75211 | 25.0 | 3.462 |
| 8 | 229.16700 | 2.75880 | 1.88300 | 40.8 | 4.557 |
| 9 | −10.18170 | 0.20000 | | | 5.308 |
| 10* | 32.73300 | 4.21140 | 1.66547 | 55.2 | 6.772 |
| 11* | −11.63770 | 2.42630 | | | 7.126 |
| 12* | −286.45650 | 0.90000 | 1.68400 | 31.3 | 7.472 |
| 13 | 53.16900 | (BF) | | | 7.416 |
| Image surface | ∞ | | | | |

TABLE 5

(Aspherical data)

Surface No. 3

K = 0.00000E+00, A4 = 1.99000E−05, A6 = 4.70000E−06,
A8 = −1.98000E−07 A10 = 3.95000E−09, A12 = −3.40000E−11,
A14 = 0.00000E+00

TABLE 5-continued (Aspherical data)

Surface No. 4

K = 0.00000E+00, A4 = −4.01000E−05, A6 = 1.06000E−05,
A8 = −8.67000E−07 A10 = 3.37000E−08, A12 = −6.64000E−10,
A14 = 5.11000E−12
Surface No. 10

K = 0.00000E+00, A4 = −2.71000E−05, A6 = 9.65000E−07,
A8 = −2.36000E−08 A10 = 1.99000E−10, A12 = 0.00000E+00,
A14 = 0.00000E+00
Surface No. 11

K = 0.00000E+00, A4 = 1.72000E−04, A6 = −7.87000E−07,
A8 = 3.15000E−08 A10 = −5.60000E−10, A12 = 4.20000E−12,
A14 = 0.00000E+00
Surface No. 12

K = 0.00000E+00, A4 = 3.96000E−05, A6 = −1.24000E−06,
A8 = 1.41000E−08 A10 = −8.76000E−11, A12 = 2.33000E−13,
A14 = 0.00000E+00

TABLE 6

(Various data)

| | |
|---|---|
| Focal length | 14.4998 |
| F-number | 2.58001 |
| View angle | 37.2105 |
| Image height | 10.000 |
| Overall length of lens system | 41.6988 |
| BF | 15.1521 |

Numerical Example 3

The single focal length lens system of Numerical Example 3 corresponds to Embodiment 3 shown in FIG. 5. Table 7 shows the surface data of the single focal length lens system. Table 8 shows the aspherical data. Table 9 shows various data.

TABLE 7

(Surface data)

| Surface number | r | d | nd | vd | Effective diameter |
|---|---|---|---|---|---|
| Object surface | ∞ | | | | |
| 1* | −303.92490 | 0.70000 | 1.58332 | 59.1 | 5.970 |
| 2* | 12.88600 | 2.34940 | | | 5.237 |
| 3 | 21.67310 | 1.47070 | 1.90366 | 31.3 | 4.500 |
| 4 | −106.29270 | 1.35180 | | | 4.979 |
| 5 (Diaphragm) | ∞ | 3.46350 | | | 3.098 |
| 6 | ∞ | 1.74370 | | | 3.082 |
| 7 | −5.56740 | 0.50000 | 1.75211 | 25.0 | 3.416 |
| 8 | −48.00860 | 0.01000 | 1.56732 | 42.8 | 4.453 |
| 9 | −48.00860 | 2.81780 | 1.80420 | 46.5 | 4.460 |
| 10 | −8.60140 | 0.20000 | | | 5.287 |
| 11* | 35.42730 | 4.30000 | 1.66547 | 55.2 | 6.895 |
| 12* | −10.81740 | 1.60000 | | | 7.239 |
| 13 | 244.83460 | 0.80000 | 1.68400 | 31.3 | 7.333 |
| 14* | 30.30140 | (BF) | | | 7.336 |
| Image surface | ∞ | | | | |

TABLE 8

(Aspherical data)

Surface No. 1

$K = 0.00000E+00, A4 = 5.18000E-05, A6 = -6.56000E-06,$
$A8 = 2.59000E-07\ A10 = -5.38000E-09, A12 = 4.54000E-11$

Surface No. 2

$K = 0.00000E+00, A4 = 3.56000E-05, A6 = -1.33000E-05,$
$A8 = 6.63000E-07\ A10 = -1.85000E-08, A12 = 2.11000E-10$

Surface No. 11

$K = 0.00000E+00, A4 = -2.67000E-05, A6 = -5.47000E-07,$
$A8 = 1.31000E-08\ A10 = -7.08000E-11, A12 = 0.00000E+00$

Surface No. 12

$K = 0.00000E+00, A4 = 2.16000E-04, A6 = -3.18000E-06,$
$A8 = 7.85000E-08\ A10 = -8.44000E-10, A12 = 4.55000E-12$

Surface No. 14

$K = 0.00000E+00, A4 = -7.15000E-05, A6 = 3.59000E-06,$
$A8 = -7.29000E-08\ A10 = 7.96000E-10, A12 = -3.52000E-12$

TABLE 9

(Various data)

| | |
|---|---|
| Focal length | 14.5502 |
| F-number | 2.58104 |
| View angle | 37.1364 |
| Image height | 10.0000 |
| Overall length of lens system | 37.1796 |
| BF | 15.8727 |

Numerical Example 4

The single focal length lens system of Numerical Example 4 corresponds to Embodiment 4 shown in FIG. 7. Table 10 shows the surface data of the single focal length lens system. Table 11 shows the aspherical data. Table 12 shows various data.

TABLE 10

(Surface data)

| Surface number | r | d | nd | vd | Effective diameter |
|---|---|---|---|---|---|
| Object surface | ∞ | | | | |
| 1* | 41.90990 | 0.70000 | 1.60602 | 57.4 | 7.016 |
| 2* | 8.23160 | 3.24320 | | | 5.848 |
| 3 | 12.63910 | 2.01080 | 1.80450 | 39.6 | 5.110 |
| 4 | 112.86900 | 2.01980 | | | 4.716 |
| 5 (Diaphragm) | ∞ | 3.68080 | | | 3.250 |
| 6 | ∞ | 1.69840 | | | 3.250 |
| 7 | -5.76040 | 0.45000 | 1.74077 | 27.8 | 3.483 |
| 8 | -87.78370 | 0.01000 | 1.56732 | 42.8 | 4.346 |
| 9 | -87.78370 | 2.65120 | 1.80420 | 46.5 | 4.352 |
| 10 | -8.16850 | 0.20000 | | | 5.027 |
| 11* | 24.50540 | 4.40000 | 1.60602 | 57.4 | 6.568 |
| 12* | -11.06420 | 1.88940 | | | 6.900 |

TABLE 10-continued (Surface data)

| Surface number | r | d | nd | vd | Effective diameter |
|---|---|---|---|---|---|
| 13* | -19.98820 | 0.70000 | 1.68400 | 31.3 | 6.955 |
| 14 | -105.11770 | (BF) | | | 7.203 |
| Image surface | ∞ | | | | |

TABLE 11

(Aspherical data)

Surface No. 1

$K = 0.00000E+00, A4 = -1.85000E-04, A6 = 4.42000E-06,$
$A8 = -5.27000E-08\ A10 = 2.86000E-10$

Surface No. 2

$K = 0.00000E+00, A4 = -2.87000E-04, A6 = -3.56000E-07,$
$A8 = 6.41000E-08\ A10 = -1.14000E-09$

Surface No. 11

$K = 0.00000E+00, A4 = -6.37000E-05, A6 = 3.64000E-07,$
$A8 = -2.81000E-09\ A10 = 3.77000E-11$

Surface No. 12

$K = 0.00000E+00, A4 = 1.47000E-04, A6 = 8.71000E-07,$
$A8 = -1.25000E-08\ A10 = 1.53000E-10$

Surface No. 13

$K = 2.83000E+00, A4 = 5.75000E-05, A6 = 7.16000E-07,$
$A8 = -7.82000E-09\ A10 = 8.78000E-11$

TABLE 12

(Various data)

| | |
|---|---|
| Focal length | 14.4499 |
| F-number | 2.58048 |
| View angle | 37.2974 |
| Image height | 10.0000 |
| Overall length of lens system | 38.6988 |
| BF | 15.0452 |

Numerical Example 5

The single focal length lens system of Numerical Example 5 corresponds to Embodiment 5 shown in FIG. 9. Table 13 shows the surface data of the single focal length lens system. Table 14 shows the aspherical data. Table 15 shows various data.

TABLE 13

(Surface data)

| Surface number | r | d | nd | vd | Effective diameter |
|---|---|---|---|---|---|
| Object surface | ∞ | | | | |
| 1* | 40.00000 | 0.70000 | 1.60602 | 57.4 | 6.535 |
| 2* | 7.04530 | 2.53080 | | | 5.259 |
| 3 | 10.60920 | 1.63120 | 1.83400 | 37.3 | 4.765 |
| 4 | 23.14870 | 2.21040 | | | 4.390 |
| 5 (Diaphragm) | ∞ | 2.10000 | | | 3.281 |
| 6 | ∞ | 1.75670 | | | 3.400 |
| 7 | 11.27990 | 1.81650 | 1.83400 | 37.3 | 3.612 |
| 8 | 18.92380 | 2.59870 | | | 3.769 |
| 9 | -7.65990 | 0.45000 | 1.80351 | 25.0 | 4.153 |
| 10 | -307.35450 | 0.01000 | 1.56732 | 42.8 | 5.013 |

TABLE 13-continued (Surface data)

| Surface number | r | d | nd | vd | Effective diameter |
|---|---|---|---|---|---|
| 11 | −307.35450 | 2.96380 | 1.80300 | 46.5 | 5.019 |
| 12 | −9.09880 | 0.20000 | | | 5.595 |
| 13* | 23.00030 | 2.92800 | 1.60602 | 57.4 | 6.624 |
| 14* | −18.26310 | 1.68040 | | | 6.800 |
| 15* | −19.14590 | 0.70000 | 1.68400 | 31.3 | 6.946 |
| 16 | −47.67650 | (BF) | | | 7.199 |
| Image surface | ∞ | | | | |

TABLE 14

(Aspherical data)

Surface No. 1

K = 0.00000E+00, A4 = −2.18000E−04, A6 = 8.96000E−06,
A8 = −1.17000E−07 A10 = 5.89000E−10

Surface No. 2

K = 0.00000E+00, A4 = −3.26000E−04, A6 = −2.44000E−06,
A8 = 3.94000E−07 A10 = −7.49000E−09

Surface No. 13

K = 0.00000E+00, A4 = −5.12000E−05, A6 = −2.39000E−06,
A8 = 2.19000E−08 A10 = −1.42000E−10

Surface No. 14

K = 0.00000E+00, A4 = 1.34000E−04, A6 = −1.58000E−06,
A8 = 2.67000E−09 A10 = 2.13000E−10

Surface No. 15

K = 3.54000E+00, A4 = 1.09000E−04, A6 = 1.00000E−07,
A8 = 1.06000E−08 A10 = 5.68000E−11

TABLE 15

(Various data)

| Focal length | 14.0001 |
|---|---|
| F-number | 2.58048 |
| View angle | 38.2841 |
| Image height | 10.0000 |
| Overall length of lens system | 38.8990 |
| BF | 14.6225 |

Numerical Example 6

The single focal length lens system of Numerical Example 6 corresponds to Embodiment 6 shown in FIG. 11. Table 16 shows the surface data of the single focal length lens system. Table 17 shows the aspherical data. Table 18 shows various data.

TABLE 16

(Surface data)

| Surface number | r | d | nd | vd | Effective diameter |
|---|---|---|---|---|---|
| Object surface | ∞ | | | | |
| 1 | 21.82300 | 0.70000 | 1.52300 | 70.1 | 6.202 |
| 2* | 7.99110 | 4.82290 | | | 5.166 |
| 3 | −8.97820 | 0.45000 | 1.80610 | 33.3 | 4.165 |
| 4 | −24.09730 | 0.20000 | | | 4.177 |
| 5 | 19.09650 | 2.34010 | 1.80470 | 41.0 | 4.052 |
| 6* | −11.76320 | −0.20000 | | | 3.838 |

TABLE 16-continued (Surface data)

| Surface number | r | d | nd | vd | Effective diameter |
|---|---|---|---|---|---|
| 7 (Diaphragm) | ∞ | 5.19630 | | | 3.536 |
| 8 | ∞ | 1.85980 | | | 3.432 |
| 9 | −5.94310 | 0.45000 | 1.84666 | 23.8 | 3.722 |
| 10 | −24.33140 | 0.01000 | 1.56732 | 42.8 | 4.577 |
| 11 | −24.33140 | 2.76980 | 1.77250 | 49.6 | 4.584 |
| 12 | −7.43100 | 0.20000 | | | 5.266 |
| 13 | 119.25950 | 2.76100 | 1.80359 | 40.8 | 6.450 |
| 14* | −15.01880 | 1.67020 | | | 6.701 |
| 15 | −16.54680 | 0.50000 | 1.84666 | 23.8 | 6.822 |
| 16 | −26.16940 | (BF) | | | 7.065 |
| Image surface | ∞ | | | | |

TABLE 17

(Aspherical data)

Surface No. 2

K = 0.00000E+00, A4 = −5.70000E−06, A6 = −3.23000E−06,
A8 = 1.68000E−07 A10 = −2.82000E−09

Surface No. 6

K = 0.00000E+00, A4 = 1.44000E−04, A6 = 4.69000E−06,
A8 = −3.93000E−07 A10 = 1.19000E−08

Surface No. 14

K = 0.00000E+00, A4 = 7.94000E−05, A6 = 2.04000E−07,
A8 = −2.42000E−09 A10 = 3.89000E−11

TABLE 18

(Various data)

| Focal length | 13.6690 |
|---|---|
| F-number | 2.58051 |
| View angle | 38.8794 |
| Image height | 10.0000 |
| Overall length of lens system | 38.1991 |
| BF | 14.4690 |

Numerical Example 7

The single focal length lens system of Numerical Example 7 corresponds to Embodiment 7 shown in FIG. 13. Table 19 shows the surface data of the single focal length lens system. Table 20 shows the aspherical data. Table 21 shows various data.

TABLE 19

(Surface data)

| Surface number | r | d | nd | vd | Effective diameter |
|---|---|---|---|---|---|
| Object surface | ∞ | | | | |
| 1 | 40.00000 | 0.70000 | 1.58332 | 59.1 | 5.580 |
| 2* | 7.65380 | 2.71920 | | | 4.609 |
| 3 | 170.25310 | 0.45000 | 1.56732 | 42.8 | 4.223 |
| 4 | 8.22820 | 0.01000 | 1.56732 | 42.8 | 3.920 |
| 5 | 8.22820 | 2.32130 | 1.83481 | 42.7 | 3.918 |
| 6 | −43.96630 | 0.15140 | | | 3.610 |
| 7(Diaphragm) | ∞ | 3.38920 | | | 3.415 |
| 8 | −21.63750 | 1.36480 | 1.80420 | 46.5 | 3.515 |
| 9 | −11.92890 | 1.90510 | | | 3.670 |
| 10 | ∞ | 1.80740 | | | 3.881 |

TABLE 19-continued (Surface data)

| Surface number | r | d | nd | vd | Effective diameter |
|---|---|---|---|---|---|
| 11 | −7.06150 | 0.45000 | 1.84666 | 23.8 | 4.105 |
| 12 | −51.65670 | 0.01000 | 1.56732 | 42.8 | 4.969 |
| 13 | −51.65670 | 2.43920 | 1.80420 | 46.5 | 4.976 |
| 14 | −9.39430 | 0.20000 | | | 5.500 |
| 15* | −119.79880 | 2.81490 | 1.80359 | 40.8 | 6.293 |
| 16* | −12.09290 | 1.40000 | | | 6.669 |
| 17 | −33.07970 | 0.60000 | 1.80518 | 25.5 | 6.904 |
| 18 | −124.87890 | 0.70000 | | | 7.066 |
| 19 | ∞ | (BF) | | | 7.261 |
| Image surface | ∞ | | | | |

TABLE 20

(Aspherical data)

Surface No. 2

$K = 0.00000E+00, A4 = 1.08000E-04, A6 = 2.17000E-07,$
$A8 = 1.19000E-07\ A10 = 2.02000E-10$

Surface No. 15

$K = 0.00000E+00, A4 = -7.68000E-05, A6 = -5.84000E-07,$
$A8 = 1.26000E-09\ A10 = 1.76000E-11$

Surface No. 16

$K = 0.00000E+00, A4 = 3.26000E-05, A6 = -3.60000E-07,$
$A8 = -2.71000E-09\ A10 = 3.41000E-11$

TABLE 21

(Various data)

| Focal length | 14.4530 |
|---|---|
| F-number | 2.58066 |
| View angle | 37.3569 |
| Image height | 10.0000 |
| Overall length of lens system | 37.7017 |
| BF | 14.2692 |

Numerical Example 8

The single focal length lens system of Numerical Example 8 corresponds to Embodiment 8 shown in FIG. 15. Table 22 shows the surface data of the single focal length lens system. Table 23 shows the aspherical data. Table 24 shows various data.

TABLE 22

(Surface data)

| Surface number | r | d | nd | vd | Effective diameter |
|---|---|---|---|---|---|
| Object surface | ∞ | | | | |
| 1 | 14.67230 | 0.50000 | 1.69680 | 55.5 | |
| 2 | 7.38000 | 3.84970 | | | |
| 3 | −60.57130 | 0.50000 | 1.48749 | 70.4 | |
| 4 | 12.18570 | 2.18530 | 1.83481 | 42.7 | 4.763 |
| 5 | −40.76600 | 1.22500 | | | |
| 6(Diaphragm) | ∞ | 2.50000 | | | 3.404 |
| 7 | ∞ | 0.78160 | | | 4.446 |
| 8 | −22.42090 | 1.40830 | 1.48749 | 70.4 | |
| 9 | −11.92890 | 1.38540 | | | |
| 10 | −6.91500 | 0.50000 | 1.78472 | 25.7 | |
| 11 | 33.45680 | 3.44510 | 1.80359 | 40.8 | |
| 12* | −7.58050 | 2.67720 | | | 5.049 |
| 13 | 32.94300 | 2.12610 | 1.67791 | 55.5 | 6.900 |
| 14 | −55.65570 | 1.40000 | | | |
| 15* | −52.39530 | 0.70000 | 1.68400 | 31.3 | 7.143 |
| 16 | 572.19710 | (BF) | | | |
| Image surface | ∞ | | | | |

TABLE 23

(Aspherical data)

Surface No. 12

$K = 0.00000E+00, A4 = 1.24000E-04, A6 = 1.37000E-06,$
$A8 = -4.50000E-09\ A10 = 7.24000E-10$

Surface No. 15

$K = 0.00000E+00, A4 = 5.03000E-05, A6 = -9.57000E-07,$
$A8 = 7.44000E-09\ A10 = -4.21000E-11$

TABLE 24

(Various data)

| Focal length | 14.4499 |
|---|---|
| F-number | 2.58007 |
| View angle | 37.3842 |
| Image height | 10.0000 |
| Overall length of lens system | 40.3987 |
| BF | 15.2150 |

Numerical Example 9

The single focal length lens system of Numerical Example 9 corresponds to Embodiment 9 shown in FIG. 17. Table 25 shows the surface data of the single focal length lens system. Table 26 shows the aspherical data. Table 27 shows various data.

TABLE 25

(Surface data)

| Surface number | r | d | nd | vd | Effective diameter |
|---|---|---|---|---|---|
| Object surface | ∞ | | | | |
| 1 | 16.55180 | 0.50000 | 1.48749 | 70.4 | 7.242 |
| 2 | 8.06330 | 5.16330 | | | 6.115 |
| 3 | −58.30810 | 0.50000 | 1.48749 | 70.4 | 5.025 |
| 4 | 12.56480 | 2.10650 | 1.83481 | 42.7 | 4.769 |
| 5 | −44.76210 | 0.89780 | | | 4.258 |
| 6(Diaphragm) | ∞ | 2.50000 | | | 3.370 |
| 7 | ∞ | 2.64140 | | | 4.323 |
| 8 | −6.62060 | 0.50000 | 1.78472 | 25.7 | 3.697 |
| 9 | −210.76500 | 2.51650 | 1.77200 | 50.0 | 4.317 |
| 10* | −7.59550 | 1.91680 | | | 4.696 |
| 11* | 33.18920 | 2.95460 | 1.77200 | 50.0 | 6.901 |
| 12* | −16.48880 | 1.20000 | | | 7.057 |
| 13* | −22.26660 | 0.70000 | 1.80359 | 40.8 | 7.089 |
| 14 | −99.91740 | (BF) | | | 7.298 |
| Image surface | ∞ | | | | |

TABLE 26

(Aspherical data)

Surface No. 10

$K = -1.19000E-01, A4 = 0.00000E+00, A6 = 0.00000E+00,$
$A8 = 0.00000E+00\ A10 = 0.00000E+00$

Surface No. 11

$K = 0.00000E+00, A4 = -5.59000E-06, A6 = -1.27000E-06,$
$A8 = 2.70000E-08\ A10 = -1.75000E-10$

Surface No. 12

$K = 0.00000E+00, A4 = 1.53000E-04, A6 = -3.17000E-06,$
$A8 = 4.67000E-08\ A10 = -2.88000E-10$

Surface No. 13

$K = 0.00000E+00, A4 = 1.11000E-04, A6 = -2.04000E-06,$
$A8 = 2.35000E-08\ A10 = -1.70000E-10$

TABLE 27

(Various data)

| | |
|---|---|
| Focal length | 14.3237 |
| F-number | 2.48056 |
| View angle | 37.6271 |
| Image height | 10.0000 |
| Overall length of lens system | 38.8990 |
| BF | 14.8021 |

Numerical Example 10

The single focal length lens system of Numerical Example 10 corresponds to Embodiment 10 shown in FIG. 19. Table 28 shows the surface data of the single focal length lens system. Table 29 shows the aspherical data. Table 30 shows various data.

TABLE 28

(Surface data)

| Surface number | r | d | nd | vd | Effective diameter |
|---|---|---|---|---|---|
| Object surface | ∞ | | | | |
| 1 | 24.05310 | 0.50000 | 1.65308 | 58.3 | |
| 2 | 7.28060 | 2.18000 | | | 5.268 |
| 3 | 55.65140 | 0.50000 | 1.59789 | 61.6 | |
| 4 | 13.18230 | 0.20000 | | | |
| 5 | 8.72130 | 2.75560 | 1.80422 | 46.5 | |
| 6 | −95.32570 | 1.10550 | | | 4.451 |
| 7(Diaphragm) | ∞ | 4.74140 | | | 3.259 |
| 8 | −5.26930 | 0.50000 | 1.72218 | 28.1 | 3.089 |
| 9 | −43.90900 | 0.01000 | 1.56732 | 42.8 | |
| 10 | −43.90900 | 2.39310 | 1.77200 | 50.0 | |
| 11* | −6.50630 | 2.03400 | | | 6.487 |
| 12* | 30.56100 | 3.61020 | 1.59000 | 59.0 | 6.856 |
| 13* | −13.82650 | 1.20000 | | | |
| 14* | −29.79900 | 0.70000 | 1.68900 | 31.0 | |
| 15 | ∞ | (BF) | | | |
| Image surface | ∞ | | | | |

TABLE 29

(Aspherical data)

Surface No. 11

$K = 0.00000E+00, A4 = 2.44000E-04, A6 = -9.62000E-07,$
$A8 = 1.11000E-07\ A10 = 3.72000E-09$

Surface No. 12

$K = 0.00000E+00, A4 = 1.25000E-04, A6 = -6.25000E-06,$
$A8 = 8.97000E-08\ A10 = -4.04000E-10$

Surface No. 13

$K = 0.00000E+00, A4 = 2.18000E-04, A6 = -7.76000E-06,$
$A8 = 9.95000E-08\ A10 = -3.61000E-10$

Surface No. 14

$K = 0.00000E+00, A4 = 1.60000E-04, A6 = -6.60000E-06,$
$A8 = 1.07000E-07\ A10 = -6.59000E-10$

TABLE 30

(Various data)

| | |
|---|---|
| Focal length | 14.4903 |
| F-number | 2.58012 |
| View angle | 37.1889 |
| Image height | 10.0000 |
| Overall length of lens system | 36.8994 |
| BF | 14.4696 |

The following Table 31 shows the corresponding values to the individual conditions in the single focal length lens systems of each of Numerical Examples.

TABLE 31

(Values corresponding to conditions)

| | Condition | | |
|---|---|---|---|
| Numerical Example | (1): $nd_R - 0.01 \times vd_R$ | (2): $f_W/f_{GR}$ | (3): $f_W/f_{GF}$ |
| 1 | 1.371 | −0.239 | 1.165 |
| 2 | 1.371 | −0.221 | 1.107 |
| 3 | 1.371 | −0.287 | 1.179 |
| 4 | 1.371 | −0.399 | 1.234 |
| 5 | 1.371 | −0.296 | 1.135 |
| 6 | 1.609 | −0.251 | 0.911 |
| 7 | 1.550 | −0.258 | 0.822 |
| 8 | 1.371 | −0.206 | 0.469 |
| 9 | 1.396 | −0.400 | 0.978 |
| 10 | 1.379 | −0.335 | 0.871 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A single focal length lens system, in order from an object side to an image side, comprising: at least
   a front lens unit which has positive optical power or negative optical power, and which does not move along an optical axis but is fixed in focusing from an infinity in-focus condition to a close-object in-focus condition;
   a focusing lens unit which has positive optical power, and which moves along the optical axis in focusing; and
   a rear lens unit which has negative optical power, and which does not move along the optical axis but is fixed in focusing, wherein:
   the focusing lens unit includes: a cemented lens element composed of a lens element having negative optical power and a lens element having positive optical power which are cemented with each other; and a single lens element which is located on the image side relative to the cemented lens element, and which has positive optical power and an aspheric surface,
   the rear lens unit is composed of one single lens element,
   an aperture diaphragm is located between the front lens unit and the focusing lens unit,
   the following condition (2) is satisfied:

$$-0.5 < f_W/f_{GR} < -0.1 \quad (2)$$

where
   $f_W$ is a focal length of the single focal length lens system in an infinity in-focus condition, and
   $f_{GR}$ is a focal length of the rear lens unit, and
   the following condition (3) is satisfied:

$$0.4 < f_W/f_{GF} < 1.5 \quad (3)$$

where
   $f_{GF}$ is a focal length of the focusing lens unit.

2. The single focal length lens system as claimed in claim 1, wherein the following condition (1) is satisfied:

$$1.25 < nd_R - 0.01 \times vd_R < 1.85 \quad (1)$$

where
   $nd_R$ is a refractive index to the d-line of the single lens element constituting the rear lens unit, and
   $vd_R$ is an Abbe number to the d-line of the single lens element constituting the rear lens unit.

3. The single focal length lens system as claimed in claim 1, wherein the single lens element constituting the rear lens unit has at least one aspheric surface.

4. An interchangeable lens apparatus comprising:
   the single focal length lens system as claimed in claim 1; and
   a lens mount section which is connectable to a camera body including an image sensor for receiving an optical image formed by the single focal length lens system and converting the optical image into an electric image signal.

5. A camera system comprising:
   an interchangeable lens apparatus including the single focal length lens system as claimed in claim 1; and
   a camera body which is detachably connected to the interchangeable lens apparatus via a camera mount section, and includes an image sensor for receiving an optical image formed by the single focal length lens system and converting the optical image into an electric image signal.

6. A single focal length lens system, in order from an object side to an image side, comprising: at least
   a front lens unit which has positive optical power or negative optical power, and which does not move along an optical axis but is fixed in focusing from an infinity in-focus condition to a close-object in-focus condition;
   a focusing lens unit which has positive optical power, and which moves along the optical axis in focusing; and
   a rear lens unit which has negative optical power, and which does not move along the optical axis but is fixed in focusing, wherein:
   the focusing lens unit includes:
      a cemented lens element composed of a lens element having negative optical power and a lens element having positive optical power which are cemented with each other; and
      a single lens element which is located on the image side relative to the cemented lens element, and which has positive optical power and an aspheric surface,
   the rear lens unit is composed of one single lens element, and
   the following conditions (1) and (2) are satisfied:

$$1.25 < nd_R - 0.01 \times vd_R < 1.85 \quad (1)$$

$$-0.5 < f_W/f_{GR} < -0.1 \quad (2)$$

where
   $nd_R$ is a refractive index to the d-line of the single lens element constituting the rear lens unit,
   $vd_R$ is an Abbe number to the d-line of the single lens element constituting the rear lens unit,
   $f_W$ is a focal length of the single focal length lens system in an infinity in-focus condition, and
   $f_{GR}$ is a focal length of the rear lens unit.

7. The single focal length lens system as claimed in claim 6, wherein the single lens element constituting the rear lens unit has at least one aspheric surface.

8. The single focal length lens system as claimed in claim 6, wherein the following condition (3) is satisfied:

$$0.4 < f_W/f_{GF} < 1.5 \quad (3)$$

where
   $f_{GF}$ is a focal length of the focusing lens unit.

9. An interchangeable lens apparatus comprising:
   the single focal length lens system as claimed in claim 6; and
   a lens mount section which is connectable to a camera body including an image sensor for receiving an optical image formed by the single focal length lens system and converting the optical image into an electric image signal.

10. A camera system comprising:
    an interchangeable lens apparatus including the single focal length lens system as claimed in claim 6; and
    a camera body which is detachably connected to the interchangeable lens apparatus via a camera mount section, and includes an image sensor for receiving an optical image formed by the single focal length lens system and converting the optical image into an electric image signal.

* * * * *